(12) United States Patent
Mendez

(10) Patent No.: US 10,070,673 B2
(45) Date of Patent: Sep. 11, 2018

(54) PROTECTIVE SKIN SHIELDS SYSTEM

(71) Applicant: Oscar Mendez, Redondo Beach, CA (US)

(72) Inventor: Oscar Mendez, Redondo Beach, CA (US)

( * ) Notice: Subject to any disclaimer, the term of this patent is extended or adjusted under 35 U.S.C. 154(b) by 376 days.

(21) Appl. No.: 15/153,387

(22) Filed: May 12, 2016

(65) Prior Publication Data

US 2016/0338429 A1    Nov. 24, 2016

Related U.S. Application Data

(60) Provisional application No. 62/163,894, filed on May 19, 2015.

(51) Int. Cl.
*A41D 13/11* (2006.01)
*G02C 11/00* (2006.01)

(52) U.S. Cl.
CPC .......... *A41D 13/1161* (2013.01); *G02C 11/12* (2013.01)

(58) Field of Classification Search
CPC ............................. A41D 13/1161; G02C 11/02
See application file for complete search history.

(56) References Cited

U.S. PATENT DOCUMENTS

| | | | | |
|---|---|---|---|---|
| 2,281,129 A | * | 4/1942 | Wolff | G02C 7/12 2/13 |
| 2,858,539 A | * | 11/1958 | Carlson | G02C 7/16 2/13 |
| 3,011,170 A | * | 12/1961 | Lutz | G02C 7/16 2/13 |
| 3,721,490 A | * | 3/1973 | Prince | A61F 9/029 2/13 |
| 4,105,304 A | * | 8/1978 | Baker | G02C 7/12 351/47 |
| 4,298,991 A | * | 11/1981 | Recenello | G02C 9/02 2/13 |
| D290,964 S | * | 7/1987 | Kalbach | D16/338 |
| 4,821,340 A | | 4/1989 | Johnson | |
| 4,877,320 A | * | 10/1989 | Holden | A61F 9/02 351/44 |
| 5,005,214 A | * | 4/1991 | Koethe | A61F 9/045 2/12 |

(Continued)

FOREIGN PATENT DOCUMENTS

| | | |
|---|---|---|
| JP | 30036188 U | 10/1994 |
| KR | 10-2012-0092312 | 8/2012 |
| KR | 10-213-0019 690 A | 2/2013 |

OTHER PUBLICATIONS

International Search Report in PCT/US2017/031598 dated Aug. 8, 2017.

(Continued)

*Primary Examiner* — Richale Quinn
(74) *Attorney, Agent, or Firm* — Law Offices of Howard L. Hoffenberg, Esq.; Howard Leslie Hoffenberg

(57) ABSTRACT

A protective skin shields system that is mounted to eyeglasses worn by a user. The major components are a means for mounting, an interconnected and shields. The invention solves technological problems, inter alia, of bilaterally protecting the cheek, temple and forehead region of a user's face from harmful sun radiation without the use of hats, skirts, blockers and/or chemicals.

19 Claims, 22 Drawing Sheets

(56) References Cited

U.S. PATENT DOCUMENTS

| | | | | |
|---|---|---|---|---|
| 5,335,025 | A | * | 8/1994 | Wang ........................ G02C 7/10 2/13 |
| 5,428,706 | A | * | 6/1995 | Lequeux ................. F16L 53/38 392/472 |
| 6,540,347 | B1 | * | 4/2003 | Radziwon ................ G02C 7/16 2/12 |
| RE38,764 | E | * | 7/2005 | Hirschman ............ G02C 5/146 2/449 |
| D569,413 | S | * | 5/2008 | Wong .......................... D16/314 |
| 7,862,165 | B2 | | 1/2011 | Hobbs |
| 2008/0301846 | A1 | | 12/2008 | Brilllouet |
| 2012/0036609 | A1 | * | 2/2012 | Van Dalen .............. A61F 9/045 2/15 |
| 2014/0340629 | A1 | | 11/2014 | Sadler |
| 2015/0185508 | A1 | * | 7/2015 | Mazzola ................ G02C 11/12 351/44 |
| 2016/0025999 | A1 | * | 1/2016 | Chen ...................... G02C 5/006 351/63 |
| 2016/0089272 | A1 | * | 3/2016 | Li ........................... A61H 5/00 128/845 |
| 2016/0338429 | A1 | * | 11/2016 | Mendez ............. A41D 13/1161 |

OTHER PUBLICATIONS

Opinion of the International Search Authority in PCT/US2017/031598 dated Aug. 8, 2017.

\* cited by examiner

PROTECTIVE SKIN SHIELDS SYSTEM

CROSS-REFERENCE TO RELATED APPLICATIONS

This application claims priority from U.S. Provisional Application Ser. No. 62/163,894 filed on May 19, 2015. The entirety of U.S. Provisional Application Ser. No. 62/163,894 which was filed on May 19, 2015 is incorporated herein by reference.

BACKGROUND OF THE INVENTION

1. Field of the Invention

This invention pertains generally to devices for providing solar and ultraviolet radiation protection to facial skin and more particularly, this invention is directed to a shield system that is capable of being mounted to eyeglasses/sunglasses.

2. Related Art

When exposed to harmful ultraviolet radiation from the sun or other source, an alarm-like system is triggered in skin cells that excites melanin production. Melanin is a darkening pigment. Melanin production is an immune-like defense system to harmful radiation.

Like any triggering of an immune-like defense system, the triggering of the melanin defense system can under-estimate or over-estimate the radiation threat. In an individual with lighter skin, the threat is under-estimated and the more the damage to that individual's skin by sun. If the threat is over-estimated, the melanin defense system stays active constantly, or nearly constantly, and is too powerful. This can give rise to abnormalities like age spots and moles.

By reason of sun exposure, in areas around eyes, premature lines become visible. The sun's rays penetrate delicate tissue around the eyes and trigger the gradual elimination of connective tissue such as collagen. Premature lines take place as compromised collagen loses its elasticity.

Melasma is a major setback to skin condition and appearance from sun exposures. Melasma is a darkening of the skin that resembles a cloud. Typically, melasma begins in the temple area and around the eyes and slowly spreads to the upper cheeks, nose and forehead. The melasma skin disorder afflicts millions of people and especially women. Melasma can occur in individuals as young as in their early twenties.

In the long run, sun damage to skin triggers more detrimental damage to skin appearance; for example, age spots and moles, as mentioned above. Age spots and moles form as skin tissue attempts to contain damage from solar radiation.

Under the present state of the art, once the skin is damaged, that individual is left to rely on the therapeutic options of creams and procedures that can alter the individual's face features. Individuals affected with melasma treat the disorder by applying bleaching agents that lighten the skin, but, leave the skin more susceptible to damage by solar radiation. An individual whose skin has been treated with lightening products must be more vigilant to avoid sun exposures for this might turn the skin even darker. As the darkening of skin continues from want of sun protection, sufferers seek treatments of chemical peels, lasers and higher and stronger bleaching creams. These treatment options increase skin susceptibility to the sun and can be self-defeating in that the end result is a more permanent melasma condition, or in some cases, cancer.

Through the years, sun protective creams and devices have been developed for providing solar radiation protection to facial skin for those who suffer from solar skin disorders. Sun protective creams have the disadvantages of being oily, messy and shiny. This is an inconvenience especially not appealing to younger individuals. Women who were makeup prefer not to apply sun protective creams because, it will mix with makeup to generate a thick and messy mixture. Further, some individuals develop irritation in their eyes because, the sun protective cream runs down to their eye area. In some cases, the sun protective cream causes an allergic reaction to the individual's skin.

Sun protection creams have additional disadvantages as follows. The application of sun protection creams has to be done a few times a day to ensure effectiveness. To light skin individuals, applying sun protection creams on their faces gives their face a translucent look. To darker skin tone individuals, applying sun protection creams gives their face the look of having a blueish coat and/or a hue appearance. Lastly, there are manufacturers who over rate their sun protective creams to the detriment of users who do not know that the protection claims are over estimated.

Hats and visors provide solar radiation protection. They have the disadvantages of being an unwanted accessory. For some woman, hats are unwanted because, they undo a hair style. The use of visors is unwanted because, they are not trendy by standards of contemporary fashion. Hats that carry skirts provide side sun protection. Individuals find such hats to be uncomfortable and sweaty. This is particularly so for individuals in temperatures exceeding 90 degrees Fahrenheit where individuals prefer not to wear extra garments on themselves. In addition to annoying extra heat, hats that carry skirts pose an unnecessary risk of reducing needed visibility when driving, especially in heavy traffic.

Latex and elastic masks provide solar radiation protection. These masks encase and conform fit to a head with openings for eyes, noses, mouth and ears. This is an unorthodox approach to protecting a face against the sun. Latex masks pose discomfort by virtue of encasing facial skin. Such masks are laced with an unkind stereotype and obloquy by contemporary standards.

Blockers provide protection from solar radiation. Blockers include placing towels or other objects on windows to block the sun. This has the disadvantages of impeding visibility and presents a risk to drivers. This alternative is limited to individuals who are in a confined place.

Known in the art clips to the temple arms and noise bridge of eyeglasses. Such clips are taught in U.S. Pat. No. 2,858,539 A to Carlson, US Patent D290,964 S to Kalbach, U.S. Pat. No. 5,438,706 A to Lambur, U.S. Pat. No. 6,540,347 B1 to Radziwon et. al. and U.S. Pat. No. 7,862,165 B2 to Hobbs. Said patents are incorporated by reference and further discussed herein below.

Known in the art are attachments to eyeglasses arms for the purpose of blocking sun glare, shielding the eyes from being struck by flying objects and/or as a blinders to obscure distractions. Such attachments are taught in U.S. Pat. No. 3,721,490 A to Prince, U.S. Pat. No. 4,105,304 A to Baker, U.S. Pat. No. 4,298,991 A to Recenello, RE38,764 E to Hirschman and US Patent Publication 20140340629 A1 to Sadler. These devices have the disadvantage of being limited to care and protection of the eyes and eye area. They do not provide facial wide skin protection from solar radiation to the cheek, temple and forehead regions of the face.

There exists a need for a fashionable, convenient and effective device that provides substantial protection from sunlight and other harmful radiation to a face that is not achievable with creams, hats, hats with skirts, latex masks, visors, veils and blockers.

There exists a need for a fashionable, convenient and effective device that provides substantial protection from sunlight and other harmful radiation to a face that surpasses sun protection factor (SPF) nomination of about 100.

There exists a need for a fashionable, convenient and effective device that provides substantial protection from sunlight and other harmful radiation to a face that is an extension of commonly worn eyeglasses and/or sun eyeglasses.

The present invention satisfies these needs, as well as others, and generally overcomes the presently known deficiencies in the art.

SUMMARY OF THE INVENTION

The present invention is directed to a protective skin shields system. As a prefatory matter, a user is characterized by having a face with a cheek region, a temple region and a forehead region. As another prefatory matter, eyeglasses, sun eyeglasses and eyeglasses are interchangeable. They are characterized by frames having a nose bridge and temple arms and being wearable by a user.

An object of the present invention is to provide substantial protection to shield a face from sunlight and other harmful ultraviolet radiation.

An object of the present invention is to provide protection to shield a face from sunlight and other harmful ultraviolet radiation that surpasses sun protection factor (SPF) nomination of about 100 without chemicals and/or lotions.

An object of the present invention is a protective akin shields system that is an extension of commonly worn eyeglasses. A further object of the invention is a protective skin shields system that, if desired, can be removably attached to eyeglasses any time individual feels his or her eye corners, side burn, cheeks, temples and/or forehead is being exposed to too much sunlight and/or other harmful ultraviolet radiation.

An object of the invention is an extension of eyeglasses that provides protection beyond the orbital region of the eyes. A further object of the invention is an extension of eyeglasses that provides protection beyond that achievable by a visor-like attachment. A further object of the invention is an extension of eyeglasses that as desired, provides protection to the cheek region of an user, including bilateral protection. A further object of the invention is an extension of eyeglasses that provides as desired, protection to the temple region of an user, including bilateral protection. A further object of the invention is an extension of eyeglasses that provides as desired, protection to the forehead region of an user. A further object of the invention is an extension of eyeglasses that provides as desired, protection to the cheek and temple regions of an user, including bilateral protection. A further object of the invention is an extension of eyeglasses that provides as desired, protection to the cheek, temple and forehead regions of an user, including bilateral protection.

An object of the present invention is a facial accessory that provides a user with protection against sunlight and/or ultraviolet rays that is not achievable with creams, hats, hats with skirts, latex masks, visors, veils and blockers.

One aspect of the invention is an apparatus. The apparatus has a means for mounting to an eyeglasses arm or noise bridge. Physical structures for the means for mounting include a U-like clip and a hairpin-like clip having an inner surface with a resilient means which is suitable for a friction fit engagement with an eyeglasses arm or noise bridge.

The apparatus has one or more interconnectors. The interconnectors span from said means for mounting to a shield (disclosed below.) An example of an interconnector is a rocker arm having shield attaching positions. Another example of an interconnector is a tensioned ball and socket connector having a shield attaching position. The interconnector is operatively attached to the means for mounting.

As indicated, the apparatus has shields. There are cheek shields, temple shields, cheek and temple shields and/or forehead shields. As the name implies, these shields align opposite regions of a user's face and are capable of shielding and shading sunlight and/or other harmful ultraviolet radiation. The shield is configured so as comport to the topography of a user's cheek region, temple region, cheek and temple region and/or forehead region. The shields are mounted to said shield attaching positions.

Another aspect of the present invention is a kit for shielding and shading the face of a user from sunlight and/or other harmful radiation. The kit is comprised of a first protective skin shields system as described above having a cheek, temple and/or combination cheek and temple shield and a second protective skin shields system as described above having a cheek, temple and/or combination cheek and temple shield. Another aspect of the invention is the aforementioned kit also having a third protective skin shields system as described above having a forehead shield.

Another aspect of the invention is a method for shielding and shading from sun light and other harmful ultraviolet radiation the face of a user who wears eyeglasses. One step of the method is providing one to three protective skin shields system. Another step to the method is the mounting the protective skin shields systems to the temple arms and/or noise bridge of the eyeglasses on the users face. Another step is donning the eyeglasses. The order of the steps can be interchanged.

The previously described versions of the present invention has many advantages which include protection from solar and other harmful radiation of substantial areas of the face that are susceptible to developing melasma, age spots, moles and premature wrinkles.

BRIEF DESCRIPTION OF THE DRAWINGS

These and other features, aspects and advantages of the present invention will become better understood with reference to the following description, appended claims and accompanying drawings where:

DETAILED DESCRIPTION OF THE INVENTION

Figure 1A:
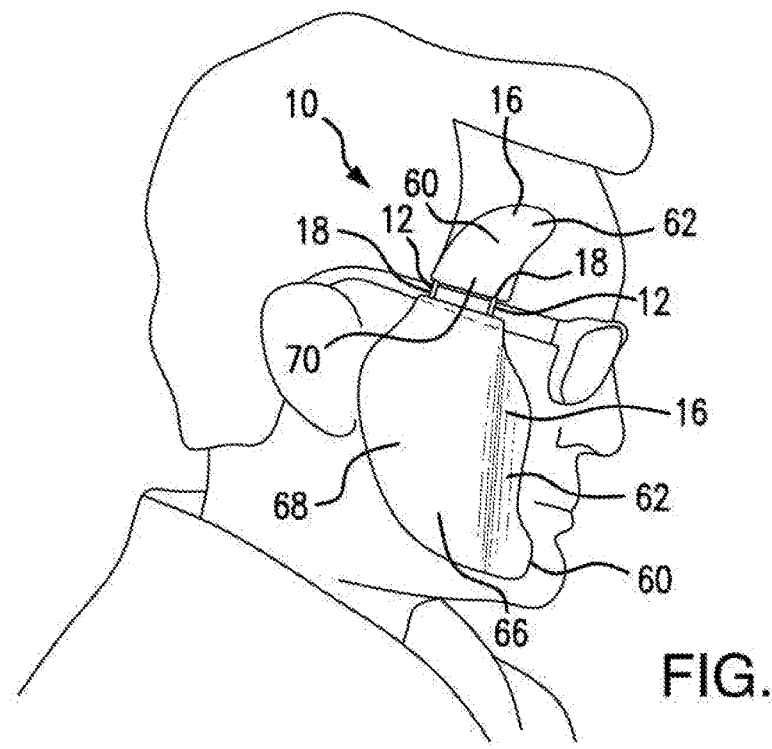
FIG. 1a shows a side perspective view an assembly having a temple shield and cheek shield according to the present invention being worn by a user.

The present invention is described more fully in the following disclosure. In this disclosure, there is a discussion of embodiments of the invention and references to the accompanying drawings in which embodiments of the invention are shown. These specific embodiments are provided so that this invention will be understood by those skilled in the art. This invention is not limited to the specific embodiments set forth herein below and in the drawings. The invention is embodied in many different forms and should be construed as such with reference to the appended claims.

Referring to the drawings collectively, in general terms and for an overview of the protective skin shields system (10), embodiments of this invention ate comprised of the following major components: a means for mounting (12), interconnector (14) and shield (16). In the disclosure that follows, each of these major components is disclosed, along with other structures or subassemblies in the embodiments of this invention. Thereafter, there is a discussion on how to use the protective skin shields system (10).

Referring to FIGS. 3a, 4c, 6, 12a, 12b, 12c, 13a and 13b, the means for mounting (12) performs the function of connecting the protective skin shields system (10) to an eyeglasses frame that will be worn by a user. This connection is typically made along a temple arm or nose bridge. The connection is typically reversibly "on" and "off" with the means for mounting (12) being a separate unit from the eyeglasses frame that is attachable and reversibly detachable. In alternative embodiments, the connection is a constant "on" with the means for mounting (12) being an integral unit with the eyeglasses frame or a permanent joint.

Figures 5A, 5B:
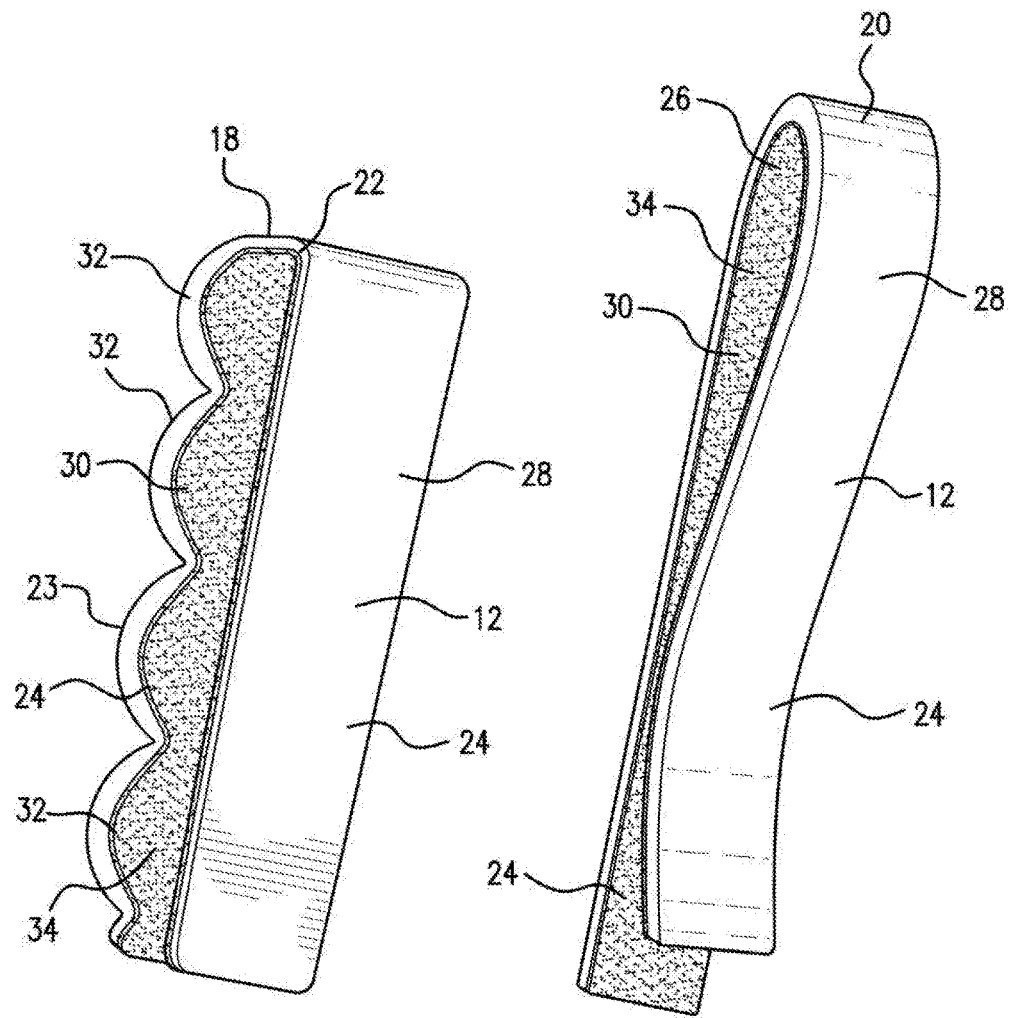
FIG. 5a shows a perspective view of a U-like shaped clip with a notched prong according to the present invention.
FIG. 5b shows a perspective view of a hairpin-like shaped clip with a smooth walled prong according to the present invention.
Figure 6:
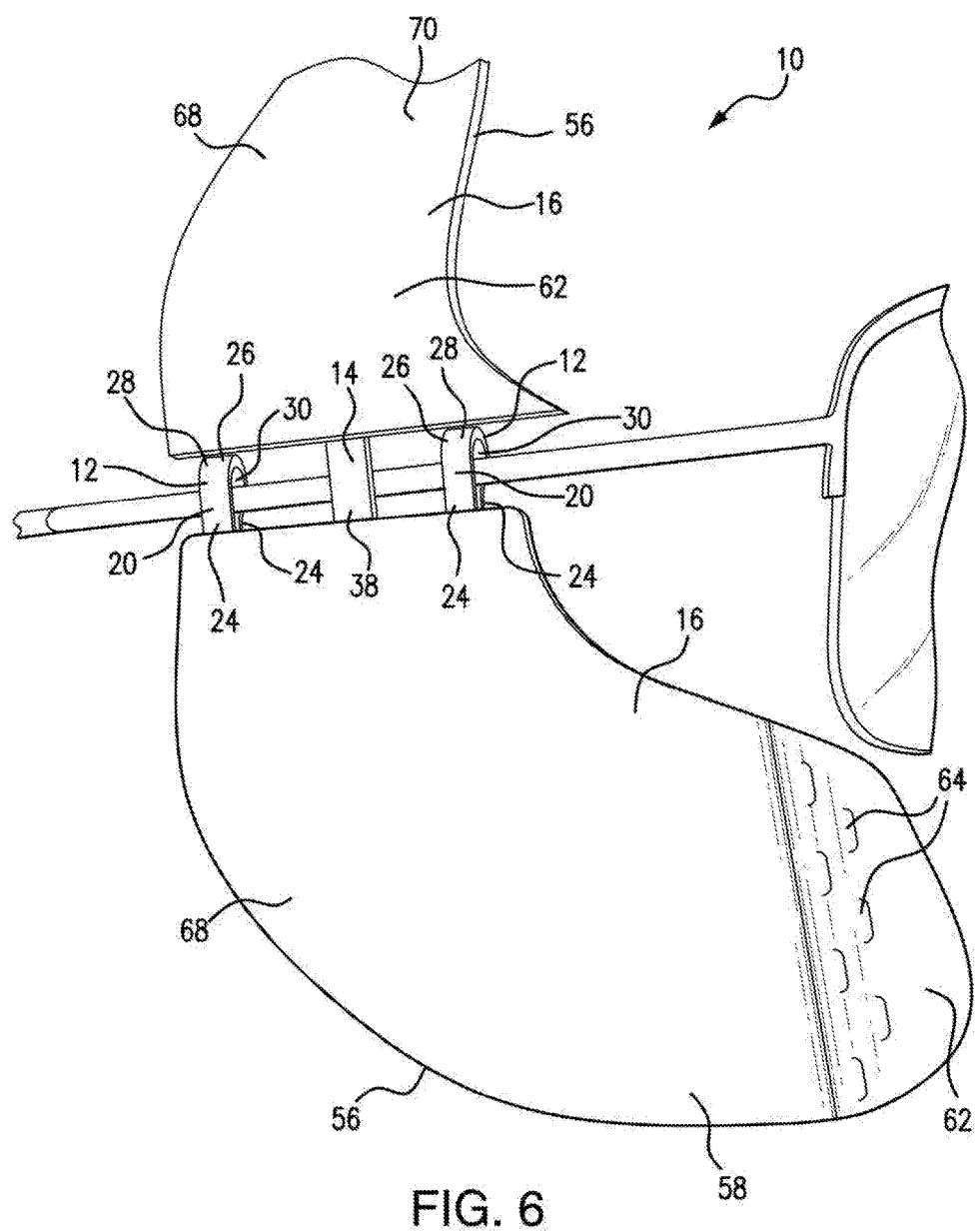
FIG. 6 shows a partially cut away perspective view of an assembly of a rocker arm, clips as a mounting means, temple shield and cheek shield with ventilation slots according to the present invention mounted to an eyeglasses arm.
Figure 7:
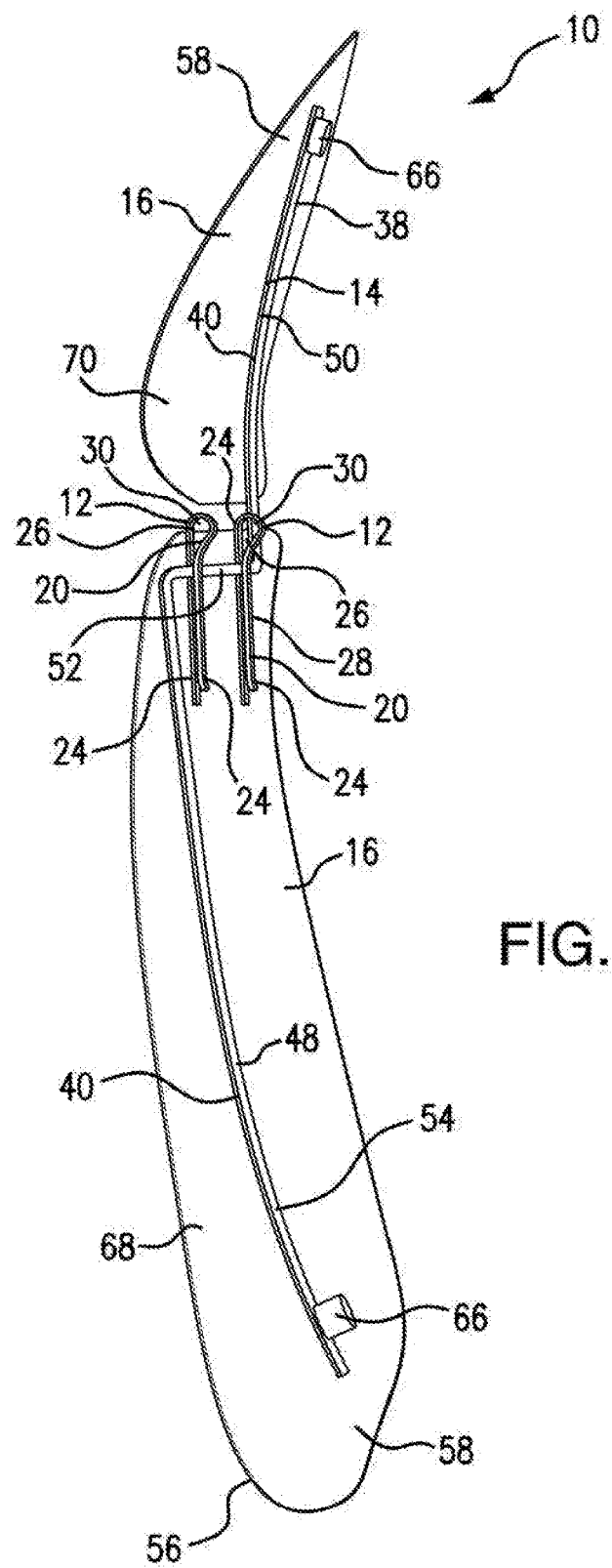
FIG. 7 shows a rear angled side elevational view of an assembly of a rocker arm, clips as a mounting means, temple shield and cheek shield with a folded over upper region according to the present invention mounted to an eyeglasses arm.
Figure 8:
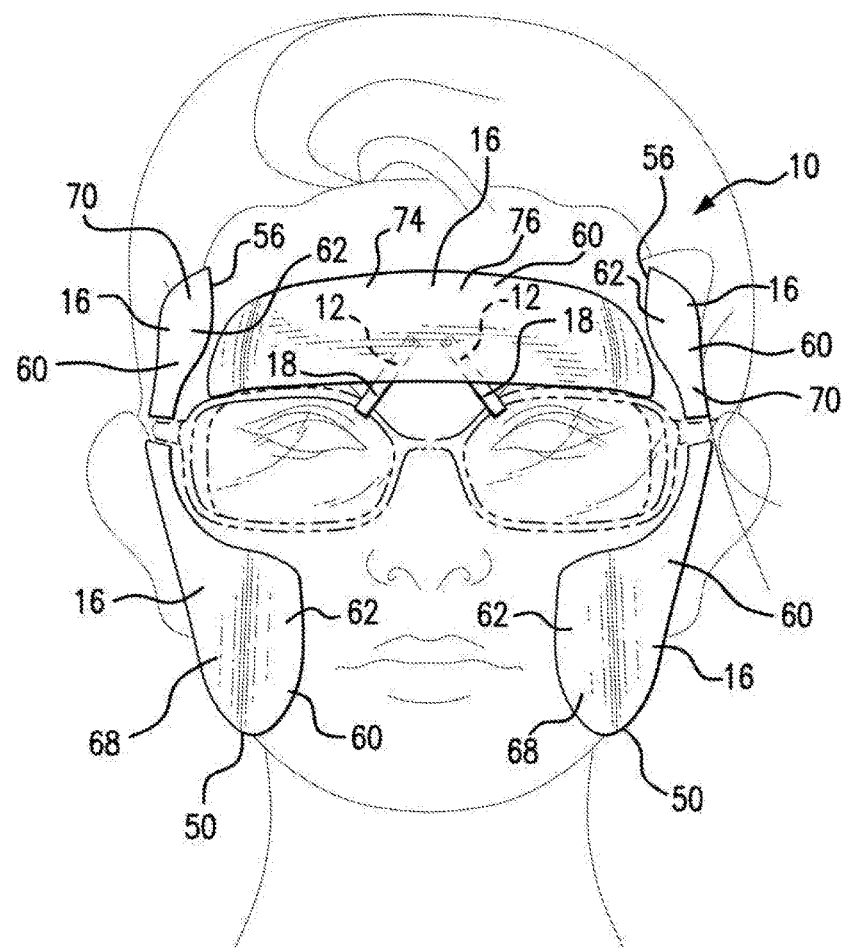
FIG. 8 shows a schematic frontal view of bilateral assemblies of a temple and cheek shields and a forehead shield with spread clips as a mounting means according to the present invention mounted on eyeglasses worn on a user's face.
Figure 9:
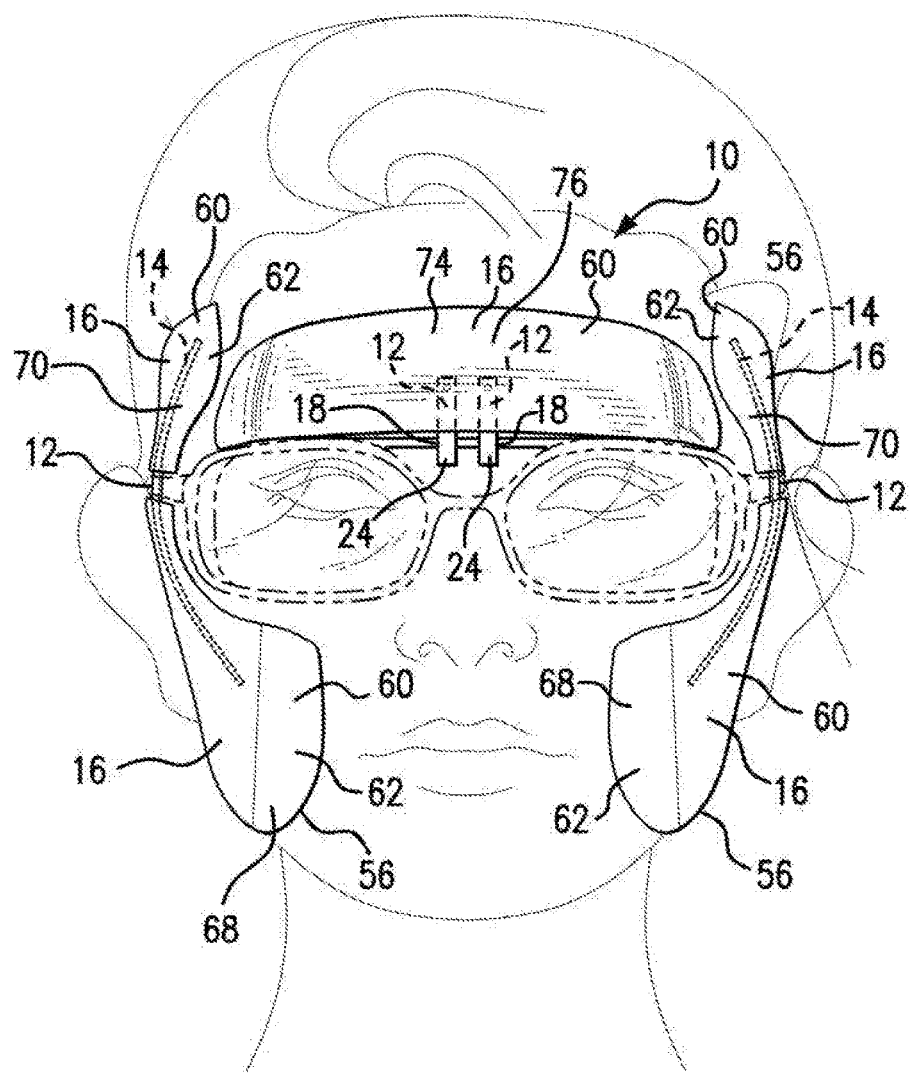
FIG. 9 shows a schematic frontal view of bilateral assemblies of a temple and cheek shields with a rocker arm in relief and a forehead shield with parallel depending clips as a mounting means according to the present invention mounted on eyeglasses worn on a user's face.

Referring to FIGS. 5a, 5b, 12a and 12b, the connection is stable such that the protective skin shields system (10) does not slide, dance or wiggle about or along the temple arm or noise bridge when subjected to the typical forces that act on the protective skin shields system (10) when worn by a user, taking into account other components (disclosed below) of the invention that cooperate with the means for mounting (12) to provide stability. Referring to FIGS. 2b and 6, in alternative embodiments, the connection allows for rotational movement about an eyeglasses arm without longitudinal sliding. In alternative embodiments, the connection is secure and sufficiently tight and strong such that a rotational torque can be exerted on the eyeglasses arm. Referring to FIGS. 5a, 5b and 7, in alternative embodiments, the connection allows vertical adjustability relative to the eyeglasses frame and hence the user's face.

Referring to FIGS. 4a, 4b, 4c, 5a, 5b, 7, 10a, 10b, 11, 12b and 13a, one group of physical structures for the means for mounting (12) is comprised of a U-like shaped clip (18) and a hairpin-like shaped clip (20). As the name implies, a U-like shaped clip (18) has a U-like shape with a crossbar (22) and two spaced-apart, oppositely disposed prongs (24, 24) depending from the crossbar (27). The prongs (24, 24) can be parallel or angle towards each other. As the name implies, a hairpin-like shaped clip (20) has a hairpin-like loop region (26) with two depending prongs (24, 24) that converge and are urged together by a spring-like resilience of the loop region. The prongs (24, 24) of a clip (18, 20) have an outer surface (28) along the exterior of the clip (18, 20) and an inner surface (30) in the region between the two oppositely opposed prongs (24, 24).

Referring to FIGS. 5a, 5b, 10a, 10b, and 11, each prong (24) of the clip (13, 20) has width. The width of the prong (24) is minimally sized so that there will be a sufficient friction (gripping power) such that the protective skin shields system (10) stably stays in place on the eyeglasses arm without drifting and/or wiggling around, taking into account other factors (disclosed below) that cooperate with the means for mounting (12) that affect stability. Generally, the narrower the height of the temple arm or noise bridge, than the greater the width of the prongs (24). A typical and preferred width is about ⅜ of an inch which is suitable for commonly sold eyeglasses frames with the understanding that in commonly sold eyeglasses frames, temple arm and noise bridge heights vary and some temple arms are styled to have a split into two members.

Referring to FIGS. 5a, 5b, 7, 10a, 10b, and 11, each prong (24) of the clip (18, 20) has length. The length of the prong (24) is minimally about the height of the temple arm or noise bridge. The length of the prong (24) can be longer for greater stability. The prongs (24) can have a length in excess of the height of a temple arm or noise to provide for a range of vertical adjustability relative to the eyeglasses frame and hence the user's face. The users of the protective skin shields system (10) will have faces that vary in length; that is, some people have long faces and other people have short faces. Through vertical adjustability, the protective skin shields system (10) can be selectively positioned at different vertical points relative to the arm or nose bridge to accommodate the length of a user's face.

Referring to FIG. 5a, in an alternative embodiment, the prong (24) is configured to have a plurality of positioning notches (32). Using the positioning notches, the protective skin shields system (10) is selectively positioned at distinct vertical positions relative to a temple arm or noise bridge. Accordingly, a user moves the protective skin shields system (10) into a position best suited for that particular user's face and locks that position in by nestling the temple arm or noise bridge into a positioning notch.

Referring to FIGS. 4a, 4b, 4c, 6, 12a, 12b, 13a, 13b and 13d, the crossbar (22) and loop region (26) are minimally sized to be slightly larger than the width of a temple arm so that the clip (18, 20) can be received and seated on the temple arm. The crossbar (22) of the U-liked shaped clip (18) can have a spring-like resiliency so as to bias the prongs (24) towards one another. The loop region (26) of the hairpin-like shaped clip (20) necessarily biases the prongs (24) towards one another. The degree spring and resiliency of the crossbar (22) and hairpin loop region (26) are selected so that that bias and springing between the prongs (24) allows for the clip (18, 20) to slide over the temple arm with a friction fit. The strength of the friction fit is great enough to stably hold in place the means for mounting (12), taking into account other factors that cooperate with the means for mounting (12) that affect stability (disclosed below.) In some embodiments, the strength of the bias and springing is limited such that the clip (18, 20) can rotate about the temple arm; but, still great enough that clip does not slide laterally or jump about.

Referring to FIGS. 5a, 5b, 10b, 11, and 12b, optionally, the inner surface (30) of a prong (24) of a clip (18, 20) has a member having resilient properties (34, 36) to enhance the friction fit. The resilient properties can be imparted by a lining (34) covering an area of the inner surface of the prong (24). Preferably, the resilient properties ore imparted by a plurality of friction grips (36) spaced apart on the inner surface of the prong (24). A preferable arrangement of friction grips (36) is a 2×2 or 3×3 array of semi-spherical friction grips (36) with a flatted head. A more preferred arrangement of friction grips (36) is an array of 2 to 4 parallel elongated friction grips (36). The elongated friction grips (36) can be oriented so as run parallel with an eyeglasses arm/nose bridge or run perpendicular to an eyeglasses arm/nose bridge with perpendicular being preferred. The members having resilient properties (34, 36) can be fabricated or formed from natural rubber, synthetic rubber or a silicone elastomer with a silicone elastomer being preferred. The member having resilient properties (34, 36) can be attached by gluing or cement.

Other physical structures for the means for mounting (12) are that taught in U.S. Pat. Nos. 2,858,539, 4,296,991, 5,438,706, 6,540,347, 7,862,165, each of which are incorporated herein by reference, and variants thereof as an ordinary artisan would recognize.

Referring to FIGS. 2a, 2b, 4a, 4b, 7, 10a, 10b, 12a, 12b, 13a, 13b, and 13d, the interconnector (14) is a physical connection that spans between the means for mounting (12) and a shield (16) (disclosed below). The interconnector (14) is operatively attached to the means for mounting (12) and to a shield (70) (disclosed below.) Optionally, the interconnector can cooperate with other components of the invention to distribute jarring and wind resistance forces so that the protective skin shields system (10) is stably mounted to the eyeglasses frame worn by a user. Typically, the interconnector is selected from the group consisting of a rocker arm (38) having shield attaching positions (40) and a tensioned ball and socket connector (42) having a shield attaching position (40).

Figure 10A:
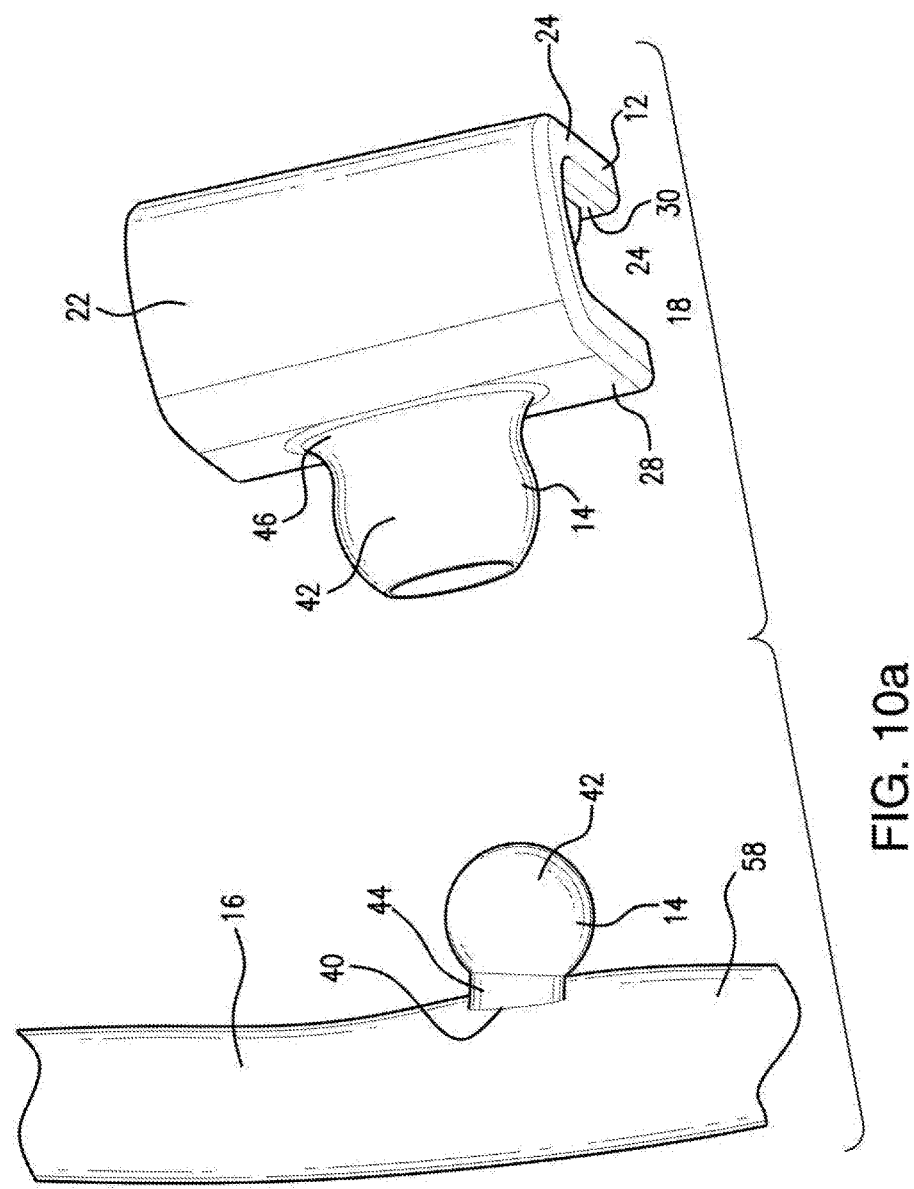
FIG. 10a shows a top elevational view of a means for mounting, an interconnector comprised of a separated ball and socket along with an attached shield according to the present invention.
Figure 10B:
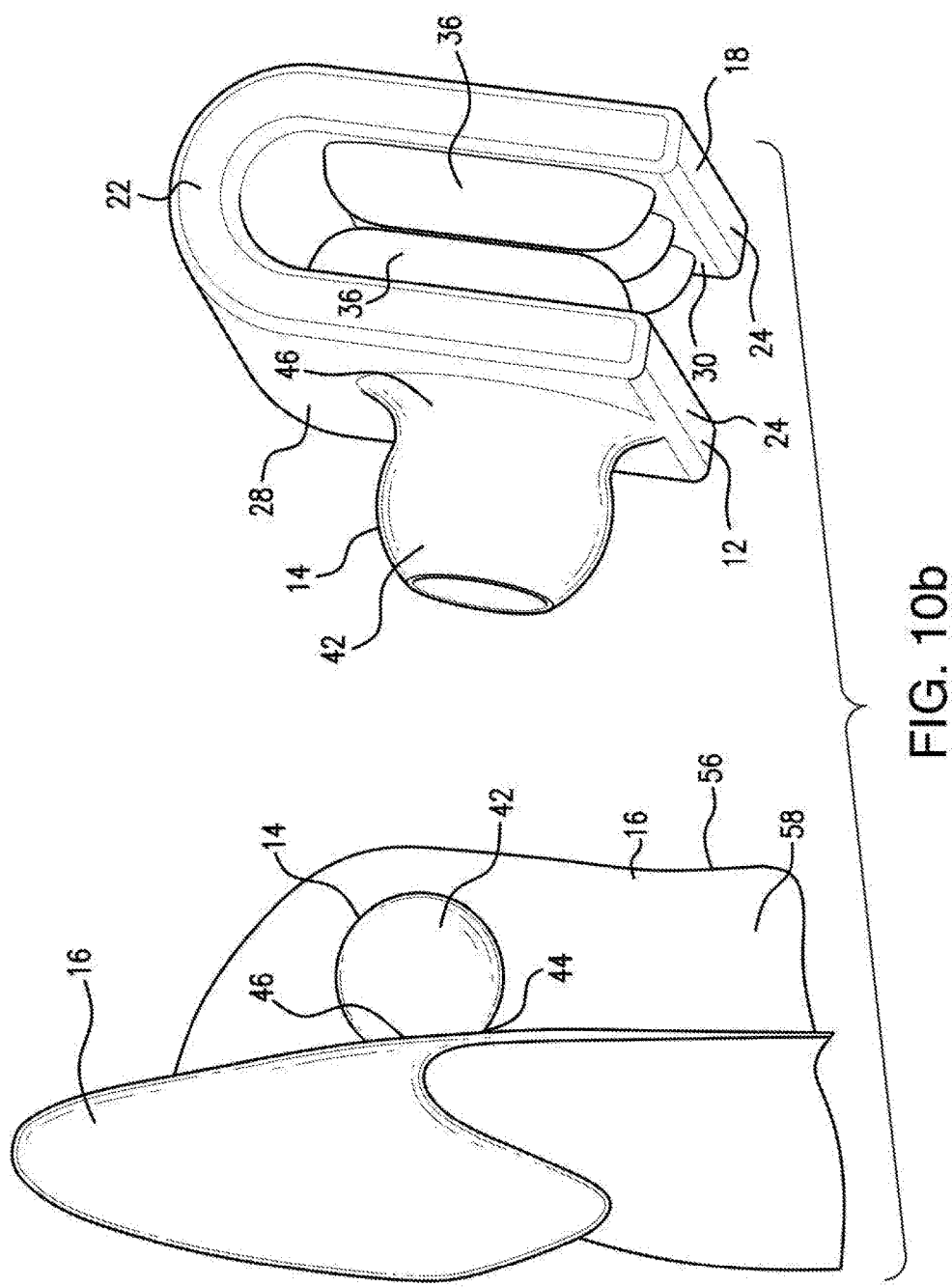
FIG. 10b shows a side elevational view of a means for mounting having elongated friction grips, interconnector comprised of a separated ball and socket along with an attached shield with a folded over upper region and bent front, region according to the present invention.
Figure 11:
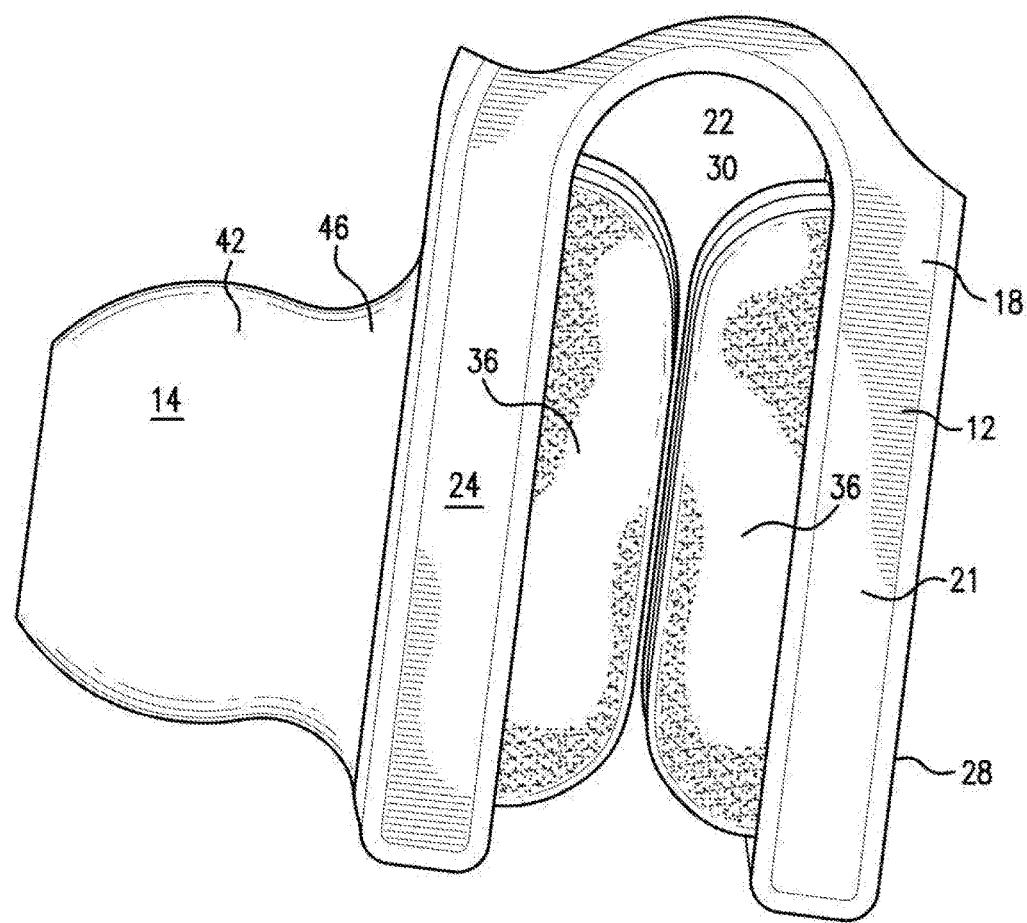
FIG. 11 shows a side elevational view of a means for mounting with vertical elongated friction grips, a ball and socket interconnector and a shield according to the present invention.
Figure 12A:
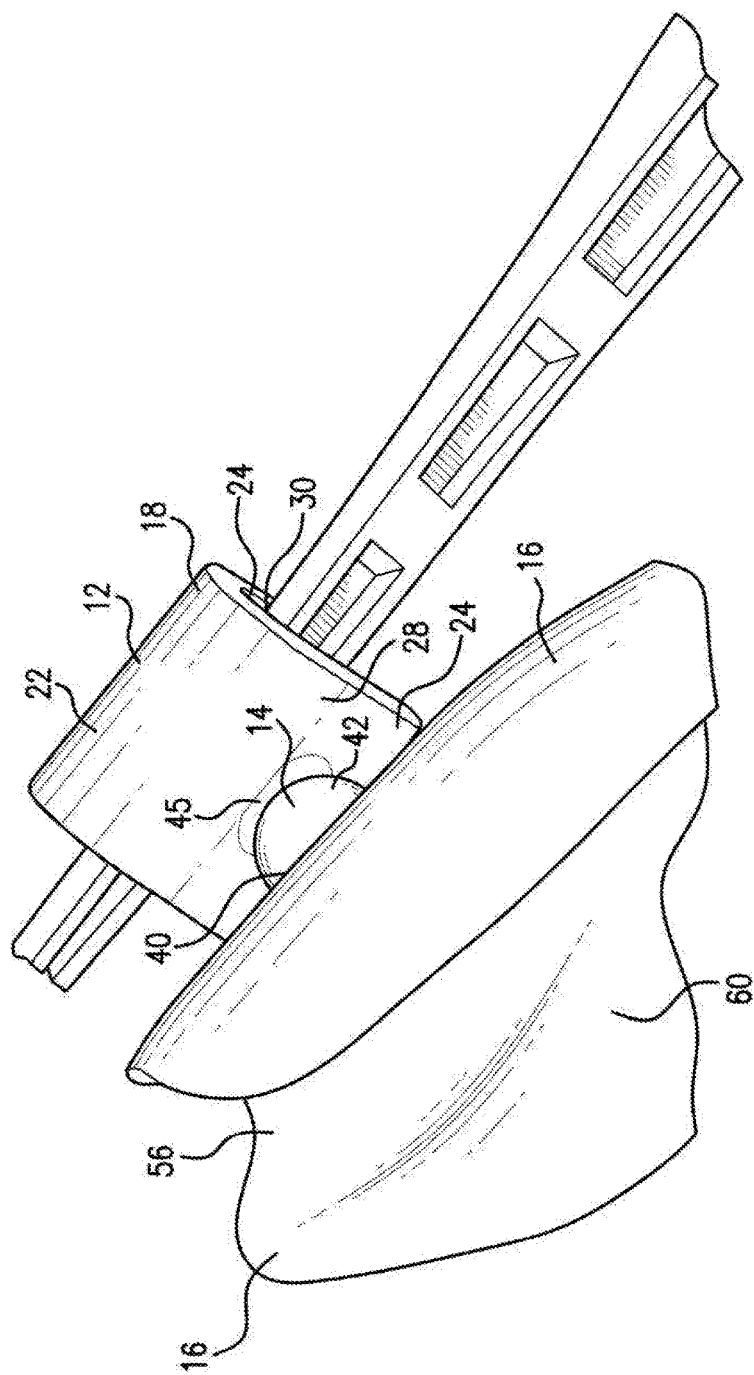
FIG. 12a shows a side angled top elevational view of a means for mounting, a ball and socket Interconnector and an attached shield mounted on an eyeglasses arm according to the present invention.
Figure 12B:
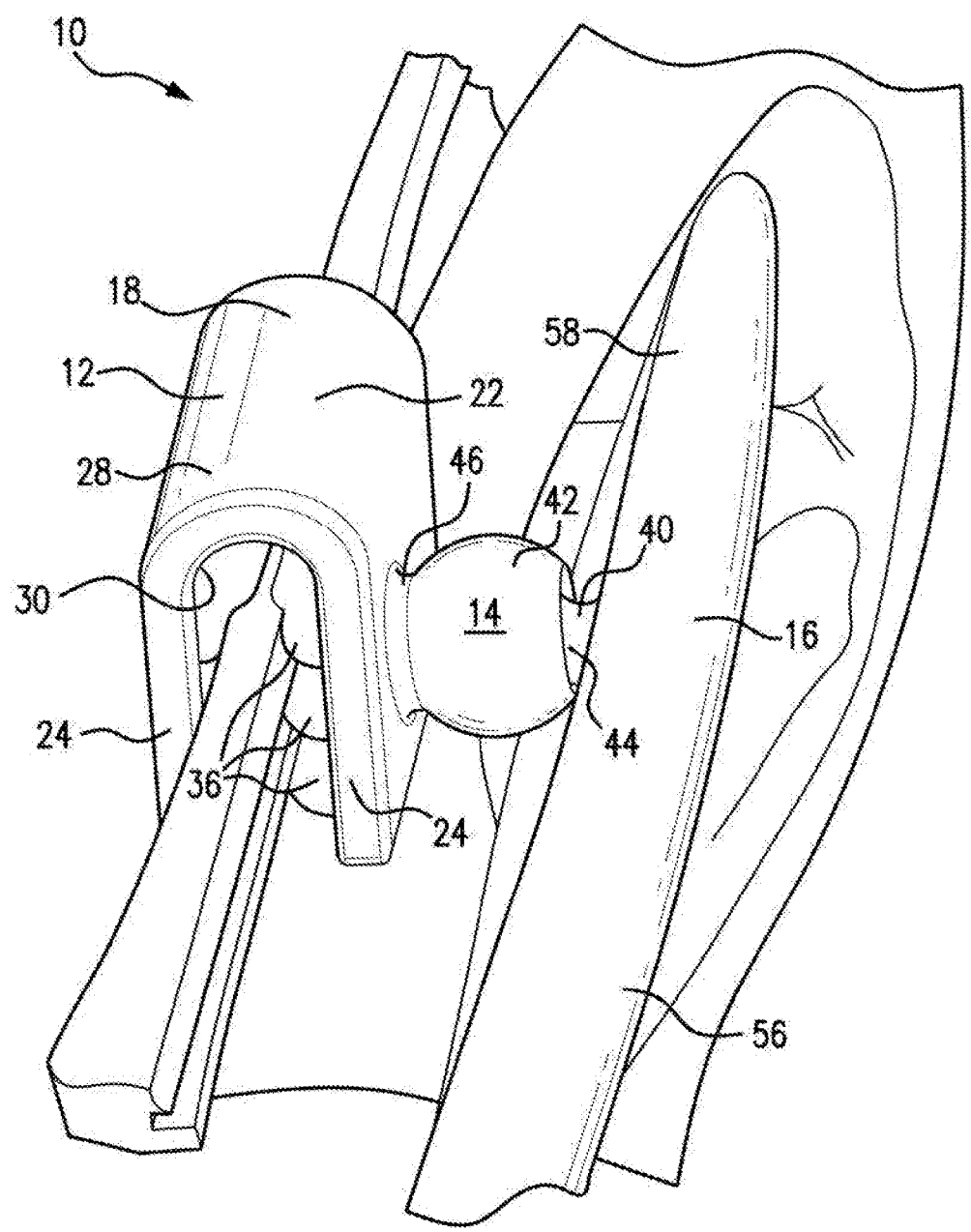
FIG. 12b shows a top elevational view of a means for mounting, a ball and socket interconnector and an attached shield mounted on an eyeglasses arm near the ear region of an user according to the present invention.
Figure 12C:
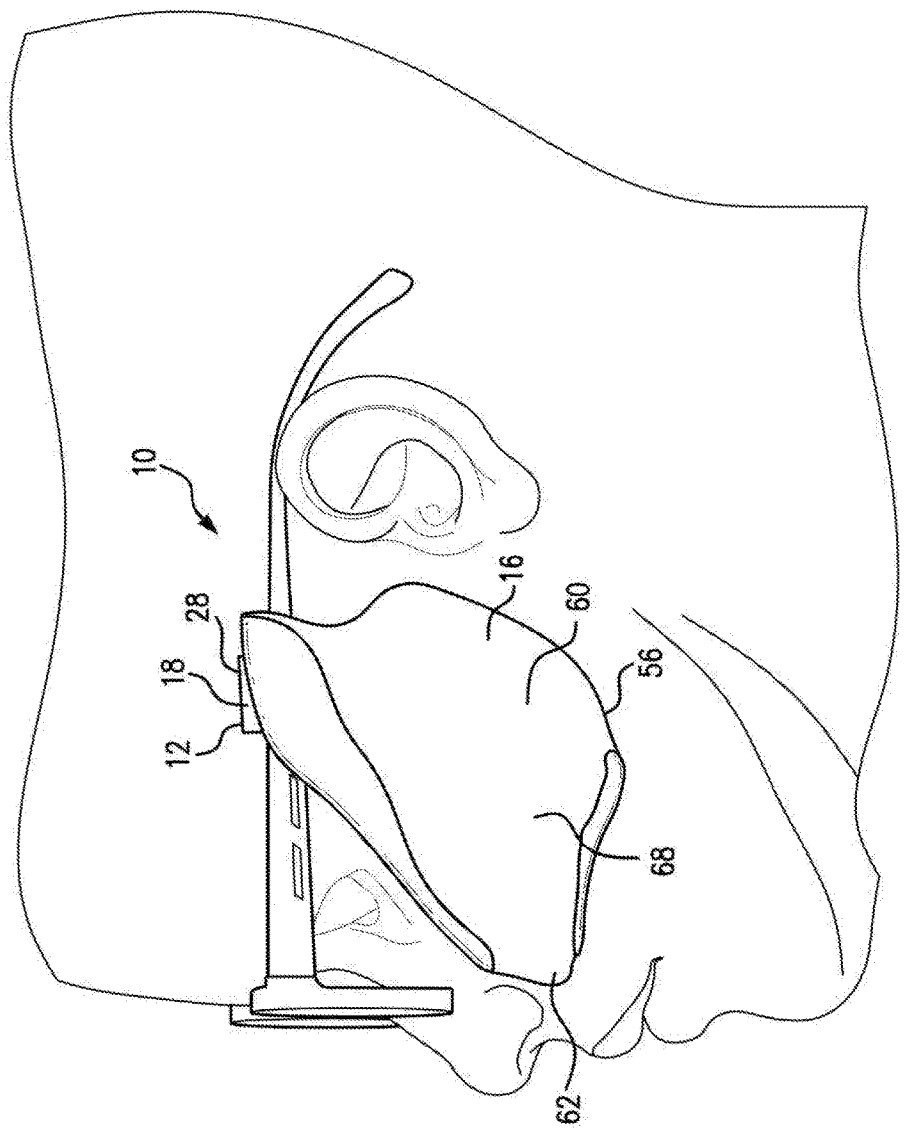
FIG. 12c shows a side elevational view of a means for mounting and an attached cheek shield with a folded over upper portion and folded over lower portion mounted on an eyeglasses arm an user according to the present invention.

Referring to FIGS. 10a and 10b, a tensioned bail and socket connector (42) typically has a spherical head with an extending connection post (44) having a attaching position (40). This structure is called a ball. The ball is received and retained in a spherical cavity of a socket. The socket has an attaching position (46). Ball and socket joints are disclosed in US Patent Publication No. 2007/0032849 to Schlapfer arid US Patent Publication No. 2012/0282015 to Ersoy which are incorporated herein by reference. A ball and socket connector can be motorized as taught in U.S. Pat. No. 9,000,628 to Ho which is incorporated herein by reference.

Continuing to refer to FIGS. 10a and 10b, in loose terms, the spherical head moves in all directions, that is, in 360°, and rotates about and axis. More precisely, there is a range of motion of the ball within the socket that includes rotating, up and down, left and right and angles there between so as to carve out a semispherical movement area with rotation.

The ball and socket connector (42) functions to manipulate the spatial position and orientation of a shield (16) so as to accommodate the dimensions of a particular users face and/or to set the desired sun shading. In a preferred embodiment, the tensioned bail and socket connector (42) has restrictors to constrain the scope of movement of the ball in the socket so that a shield (16) (disclosed below) cannot be moved into an eye orbital or be swung wide away from a face such that there is an over exposure of sunlight or ether harmful ultraviolet radiation contacting an area of a user's face. A tensioned ball and socket connector (42) has a tensioning means, e.g., a friction fit between the ball and the socket, shims, rings and the like, so that the ball retains an adjusted position within the socket.

Referring to FIGS. 12a, 12b, 13a, 13b, 13d, the ball and socket connector (42) is operatively attached to means for mounting (12) and shield (16) (discussed below) such that the spherical head (ball) with an extending connection post (44) having a attaching position (40) can move through a semispherical range of motion. The attachment can be made by cementing, gluing, fusing or welding. In alternative embodiments, the ball and socket connector (42) can be molded or otherwise fashioned integral with the means for mounting (12) and/or shield (16) (disclosed below). Not illustrated, in an alternative embodiment, a means for mounting (12) has attached to it two tensioned ball and socket connectors (42) so that two shields (16) (disclosed below) can be attached.

Continuing to refer to FIGS. 12a, 12b, 13a, 13b, 13d, in preferred embodiments, the size of the ball and socket connector (42) is relatively small in relationship to means for mounting (12) and shield (16) (disclosed below) so that the shield (16) is relatively close to an eyeglasses arm or noise bridge when the protective skin shields system (10) is mounted to eyeglasses and concomitantly, the shield (16) will be close to the face of a user. In a preferred embodiment, the connection post (44) has a length between about one (1) centimeter (cm) and about ten (10) millimeters (mm).

Not illustrated, as used herein, the terminology ball and socket connector (42) also includes a universal joint having multiple movable connections providing rotational, up and down and left and right movement with the overall result approaching a semispherical-like range of motion with the capability of holding an adjusted position. Typically, such a universal joint is comprised of three movable connections that are in series; namely, a first connection that allows for rotational movement along the axis of a rod, a second movable connection that allows for horizontal arcuate movement and a third movable connection that allows for vertical arcuate movement. At each end of the universal joint there are attaching positions. Another style universal joint having multiple movable connections is disclosed, in US Patent Publication No. 2014/248966 to Liu and incorporated herein by reference.

Referring to FIGS. 2b, 4a, 4b, and 7, a rocker arm (38) having shield attaching positions (40) has a bar (43). The bar (48) is formed from plastic or metal. The bar (48) typically has a shape that is linear, "Z"-like, "S"-like, "X"-like or "t"-like. A "Z"-like shape or "S"-like shape is preferred. The rocker arm (38) is viewed conceptionally as having an upper section (50), an intermediate section (52) and a lower section (54). The upper section (50) and lower section (54) are shield attaching positions (40). In an alternative embodiment of the invention, the shield attaching positions (40) of the rocker arm (38) is integral with one or more shields (16) (discussed below); e.g., molded as one unit.

Referring to FIGS. 1a, 2a, 2b, 4c, 6, 8 and 9, the rocker arm (38) is operatively attached to the means for mounting (12) so that the rocker arm (38) rotates about a temple arm of eyeglasses worn by a user. For operative attachment, the rocker arm (38) is typically attached at its intermediate section (52) to a means for mounting (12). In embodiments of the invention, the rocker arm (38) is fixedly attached to a means for mounting (12) by cementing, gluing, fusing or welding or by being formed integral where the means for mounting (12) can rotate about the temple arm. In alternative embodiments, the rocker arm (38) is stiffly hingedly attached to a means for mounting (12) where the means for mounting (12) does not rotate about the temple arm. Stiffly hingedly means a hinge joint where there is friction or tension between the interlaced hinge eyes (hollow cylinder-like structures) and hinge pin such that the hinge after being moved or adjusted holds a position.

Referring to FIGS. 1b, 1c, 1d, 2a, 3a, 3b, 8, 9, 12c and 13c, the shield (16) is a plate-like structure. The plate-like structure has length, breadth, a peripheral edge (56), thickness and two oppositely opposed surfaces (58, 60). The plate-like structure can be planar or have a curvature/topography (discussed below.) The plate-like structure has the property of impeding the transmission of sun light and/or other ultraviolet radiation. Referring to FIGS. 1a, 2a, 3a, 8, 9, 12c, 13a, 13b, 13c and 13d, the protective skin shields system (10) is worn on a user's face so as to define forward portion (62) an upper portion, a lower portion, an inner surface (58) and outer surface (60) of the shield (16).

Continuing to refer to FIGS. 1b, 1c, 1d, 2a, 3a, 3b, 8, 9, 12c and 13c, the shield (16) is preferable fabricated from plastics such as polyethylene, polypropylene, polyvinyl chloride, polycarbonate and polyamides. A low density material is preferred to keep down the weight of the shield (16) and provide more comfort for a user when wearing the protective skin shields system (10). In preferred embodiments, the shield (16) is made from a flexibly deformable plastic that has a modulus of flexibility such that it is bendable to reduce the potential for face cutting in the event of impact.

In alternative embodiments of the invention, colorants and light absorbing dopants can be added to the plastic to reduce or essentially completely prevent the transmission of sun light or other ultraviolet radiation. In an alternative embodiment, the shield (16) is a fabricated from a bylayer of polarized material oriented out of phase. The degree to which the bylayer is oriented out of phase selectively sets the amount of light impeded through the shield.

Continuing to refer to FIGS. 1b, 1c, 1d, 2a, 3a, 3b, 8, 9, 12c and 13c, in an alternative embodiment, paper products are used to form and fabricate the shield (16). Suitable paper products are soft carton material, tag board, compressed cellulosic fiber and card board. These materials are less preferred than plastics from the perspective of durability. In alternative embodiments, the shield (16) is fabricated from an organic linen. Depending upon the stiffness of the linen, the linen may require being strung about a peripheral frame. Such materials allow for cooling comfort and fabrication in unique designs enhancing the esthetic appeal of the shield.

Continuing to refer to FIGS. 1b, 1c, 1d, 2a, 3a, 3b, 8, 9, 12c and 13c, in alternative embodiments, metals are used to form and fabricate the shield (16). Suitable metals are steel, aluminum and brass. Metal are less preferred from the perspective of the potential for a wearer being injured by face cutting in the event of impact and from the perspective of the weight of the shield (16).

Continuing to refer to FIGS. 1b, 1c, 1d, 2a, 3a, 3b, 8, 9, 12c and 13c, the thickness of the cheek shield (68) is typically between about 1/32 of an inch to about a 1/4 of an inch. A thicker thickness is preferred for a more robust property of impeding sun light transmission and/or other ultraviolet light transmission. A thinner thickness is preferred for a more robust exchange of heat through the shield to reduce a heat build-up between the user's face and the inner surface (30) of the shield (16). A thinner shield (16) also keeps down weight for greater comfort by a user. These factors are balanced to achieve a desired overall performance.

Referring to FIGS. 1a, 1c, 2a, 3a, 3b, 3, 9, 12c, 13a, 13b, 13c and 13d, in preferred embodiments, the shield (16) is contoured to conform with the curvature and topography of cheek, temple and/or forehead regions of a human face. Different shaped shields (16) can be fabricated to suit the faces of different wearers. In preferred embodiments, the shield (16) follows and enhances facial features; for example, a cheek shield (63) follows a jaw bone line and conforms to the shape of the cheek. In most preferred embodiments, the shield (16) is is shaped to enhance a user's face symmetry.

Optionally, the shield (1C) can be shaped, textured, colored, painted and/or decorated to have an attractive appearance. Users can decide from a large variety of designs, according to taste and fancy. Decorations and shaping include gothic, medieval, futuristic and robotic themes.

Referring to FIGS. 1b, 1d, 2a, 6, 8, 9, 10b, 12a, 12c, 13b and 13c, In alternative embodiments, the forward portion (62), upper portion, lower portion and/or other peripheral portion of the shield (16) is bent, curved, arcuate, folded over and/or has an aerodynamic configuration to reduce wind drag. In a preferred embodiment, the forward portion, upper portion and/or lower portion of a shield are bent or folded over to enhance aerodynamics. In a more preferred embodiment, the forward portion (62) of a shield (16) turns or bends inward between about to 30° to about 70° degrees relative to the plane of the shield (68). Thus, when the protective skin shields system (10) is worn by a user, the forward portion (62) extends inward towards the face of the user so as to deflect wind and reduce aerodynamic drag to assist in keeping the protective skin shields system (10) in a stable position about a user's face. In addition, this provides the benefit; of facilitating distance between the shield (16) and the user's cheek for air flow for heat cooling; accentuates esthetic appeal and can acid extra shade to the skin.

Figure 1B:
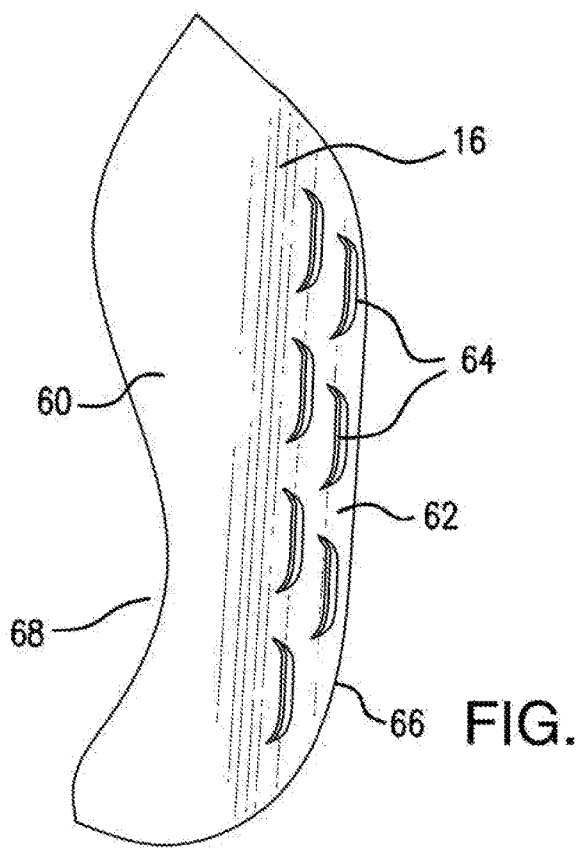
FIG. 1b shows a perspective view of the outer surface of a cheek shield having a curved and aerodynamic frontal portion according to the present invention.
Figure 1C:
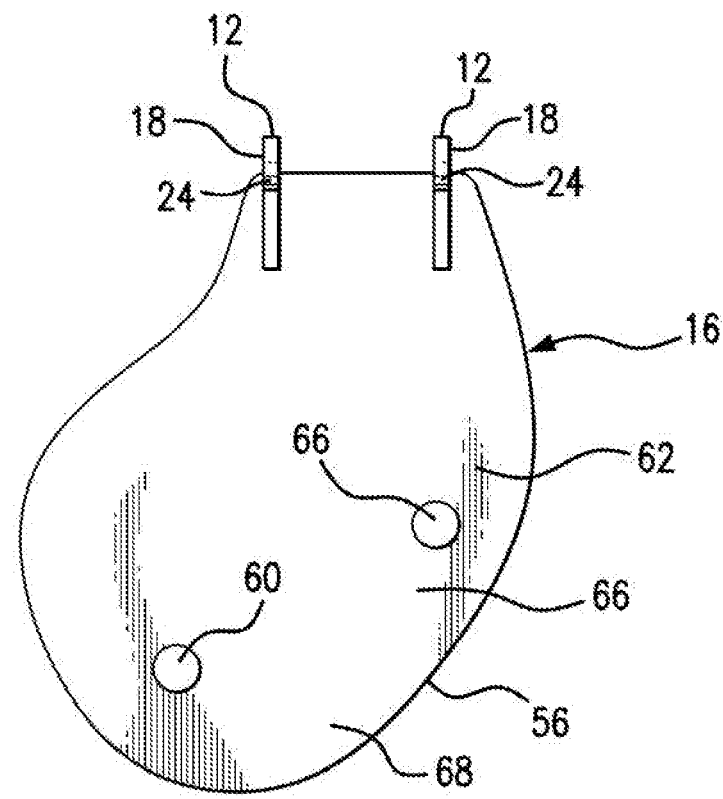
FIG. 1c shows a side elevational view of the inner surface of a cheek shield according to the present invention.
Figure 1D:
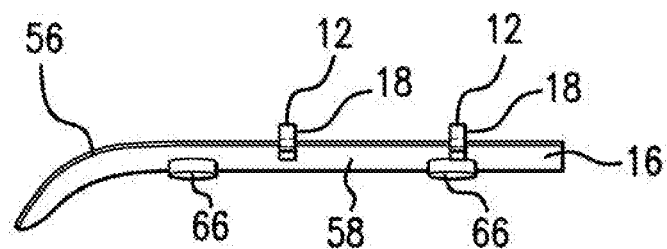
FIG. 1d shows a top elevational view of a cheek shield according to the present invention.
Figure 2A:
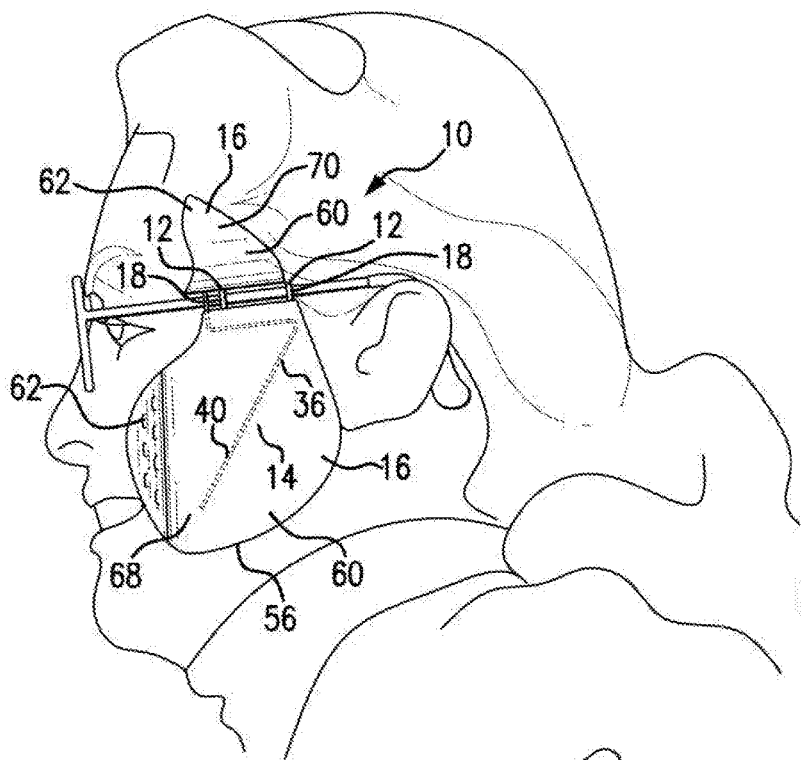
FIG. 2a shows a side perspective view an assembly having a temple shield and a cheek shield according to the present invention being worn by a user.
Figure 2B:
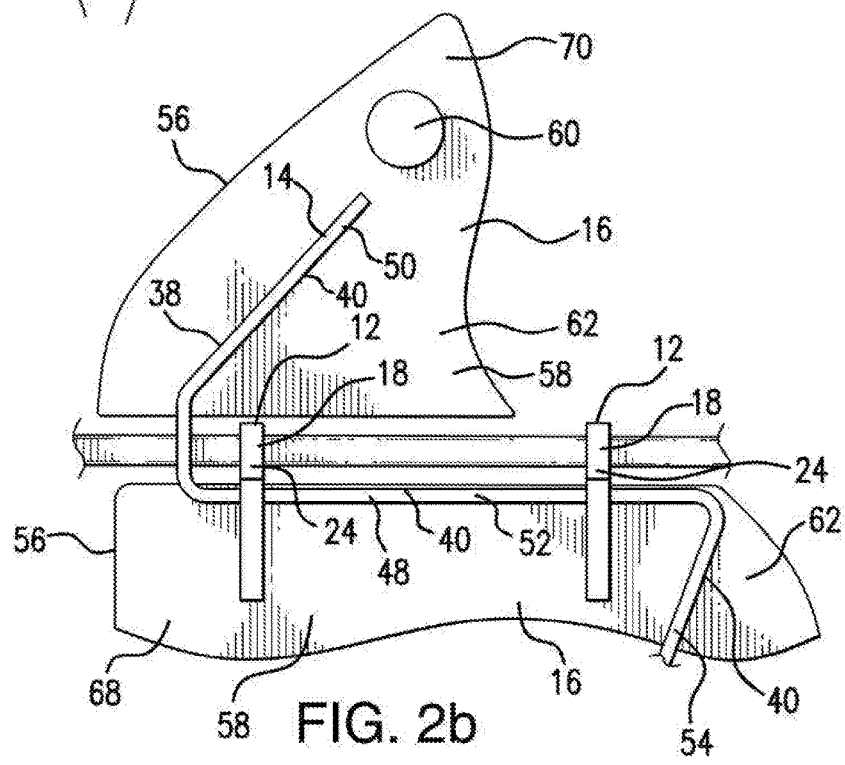
FIG. 2b shows a partially cut away side elevational view of an assembly of a rocker arm, clips, temple shield and cheek shield according to the present invention mounted to an eyeglasses arm.

Referring to FIGS. 1b, 2a, and 6, in alternative embodiments, the portion (62) conformed for wind deflection has one or more ventilation openings (64). The ventilation openings (64) enhance the influx of cool air to a space between the inner surface (30) of the shield (68) and a user's face. The ventilation openings (64) also allow for an out flux of hot air and sweat that may build up between the inner surface (30) of the shield (16) and a user's face. The ventilation openings (64) can be circular, a slit, a polygon, an irregular shape and/or a combination of the foregoing. In a preferred embodiment, the ventilation openings (64) are slits.

Continuing to refer to FIGS. 1b, 2a, and 6, in an alternative embodiment, the ventilation openings (64) are in fluid communication with longitudinal channels (not illustrated) fashioned into the inner surface (58) of the shield (16) that run along the surface so as to disburse cooling air to particular points spaced throughout the inner surface (30) of the shield (16).

Referring to FIGS. 1c, 1d, 2b, 3b, 4a, 4b, 4c and 7, optionally, the shield (16) has a member that is contactable (66) with the user's face. In preferred embodiments of the invention, the member that is contactable (66) with the user's cheek is a cushion pad that has resilient compressibility. Foam rubber is a suitable material from which to form and fabricate the cushion pad. The cushion is affixed to the inner surface (58) of the shield (16) by cement, glue, a pressure sensitive adhesive and/or a fastener. The height of the cushion pad is less than an estimated or typical distance between the inner surface (30) of the shield (16) and the face of a user when the protective skin shields system (10) is worn by an user. In a more preferred embodiment, the cushion pad is an elongated pad running along the peripheral edge (56).

Not illustrated, in alternative embodiments of the protective skin shields system (10), the member that is contactable (66) with the user's face is a pedestal assembly. The pedestal assembly is comprised of a stud which extends from the inner surface (30) of the shield (16) generally perpendicular to the inner surface (30). The stud is cemented or glued to the inner surface (53) of the shield (16) or formed integral with the shield (16). The end of the pedestal assembly is a smooth blunt end for resting on the skin. Preferably, a cushion pad, as described above, is affixed to the end of the stud. The cushion pad is affixed to the end of the stud by gluing or cementing. The length of the pedestal assembly is a distance less than the estimated or typical distance between the inner surface (30) of the shield (16) and the opposite region of a user's face when the protective skin shield system (10) is mounted to eyeglasses.

Referring to FIGS. 1a and 1b, in embodiments of the invention, the member that is contactable (66) with the user's face is an edge (56) of the shield (16). In preferred embodiments, a rocker arm (38) has a bend so that the edge (56) angles inward towards a user's face.

Referring to FIGS. 1a, 2a, 4c, 8, 9 and 12c, one type of shield is a cheek shield (68) which is intended for use in a manner where it will be located generally opposite a user's cheek. The length and breadth of the cheek shield (68) is sized and shaped such that the inner surface (53) is correspondable with an area of a user's cheek region. In preferred embodiments, the cheek shield (68) follows and enhances facial features and is aerodynamic. This enhances stability on a user's face and enhances sun protection. The larger the cheek shield (68), the greater the protection from solar and other ultraviolet radiation. For reasons of comfort, aesthetics and/or mass producing a size and shape which will be suitable for many users having different size faces, the cheek shield (68) can correspond to area of the cheek region that is less than the entire cheek.

Referring to FIGS. 1a, 2a, 4c, 8 and 9, another type of shield is a temple shield (70) which is intended for use in a manner where it will be located opposite the temple region of a user's face. The temple shield (70) is sized and shaped to have an inner surface that is correspondable with an area of a user's temple region in an analogous manner to that disclosed with respect to the cheek shield (68). In preferred embodiments, the temple shield (70) follows and enhances facial features and is aerodynamic. This enhances stability on a user's face and enhances sun protection, as well as avoiding interference with ears.

Figure 13A:
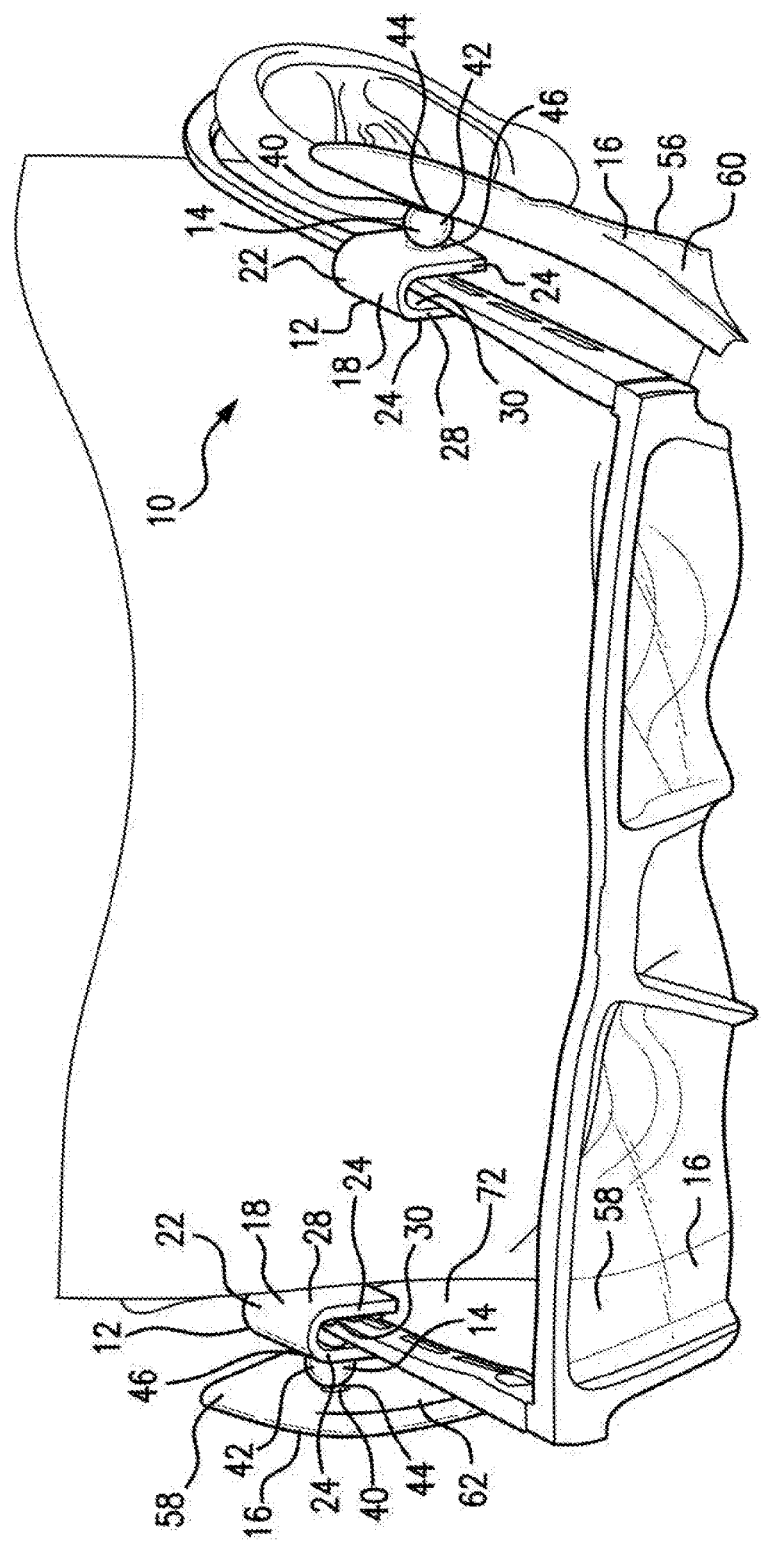
FIG. 13a is a front angled top elevational view of a first and second protective skin shades system having a means for mounting, a ball and socket interconnector and an attached combination cheek and temple shield with each mounted on an eyeglasses arm near the ear region of an user according to the present invention.
Figure 13B:
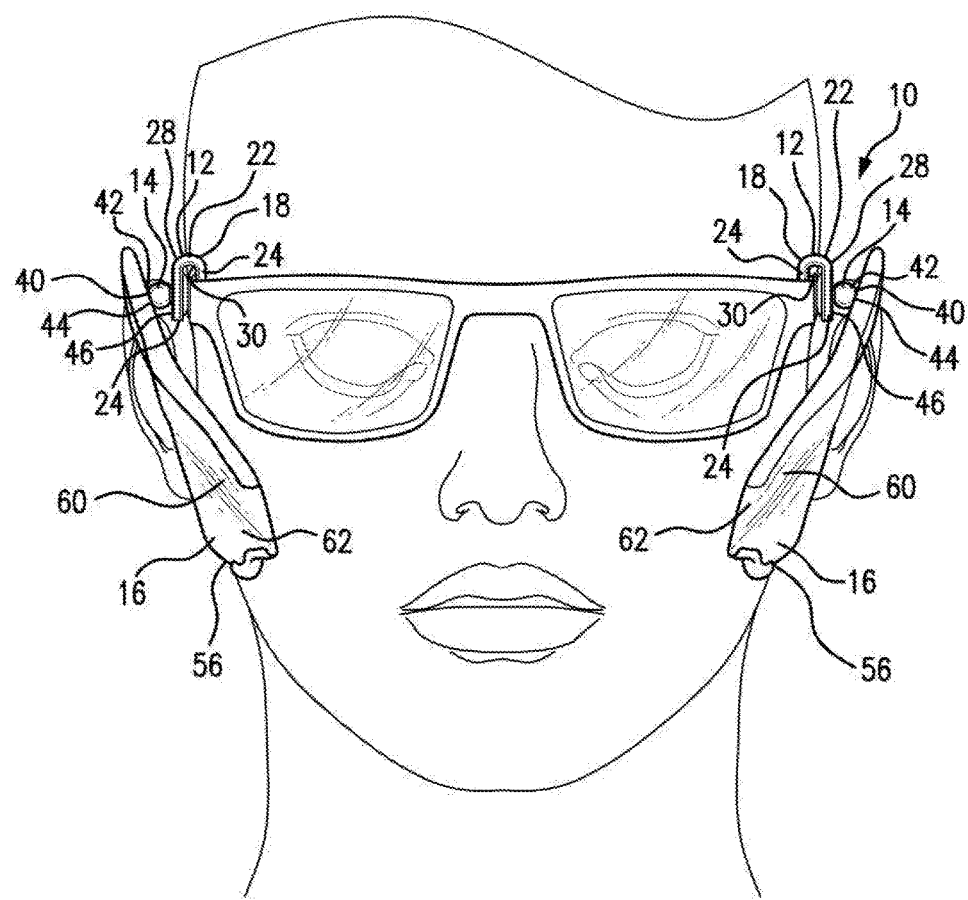
FIG. 13b is a front elevational view of a first and second protective skin shades system having a means for mounting, a ball and socket interconnector and an attached combination cheek and temple shield with each mounted on an eyeglasses arm near the ear region of an user according to the present invention.
Figure 13C:
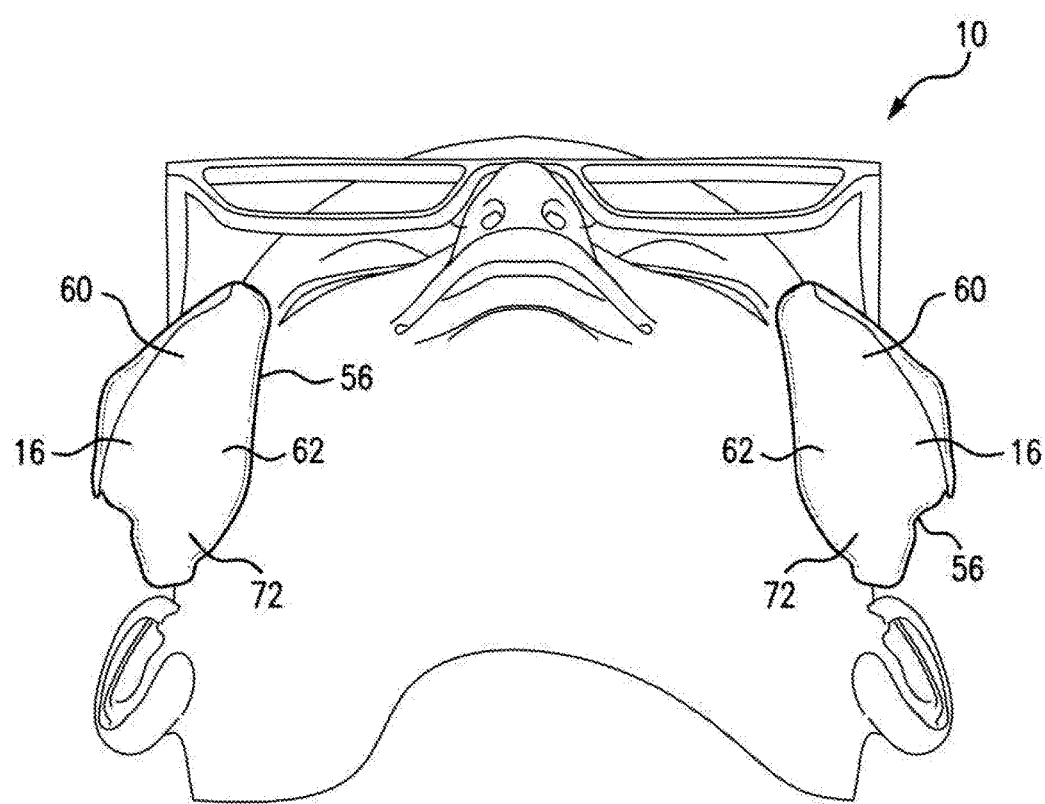
FIG. 13c is a bottom elevational view of a first and second protective skin shades system having a means for mounting, a ball and socket interconnector and an attached combination cheek and temple shield where the cheek shield has a folded over upper portion with each mounted on an eyeglasses arm near the ear region of an user according to the present invention
Figure 13D:
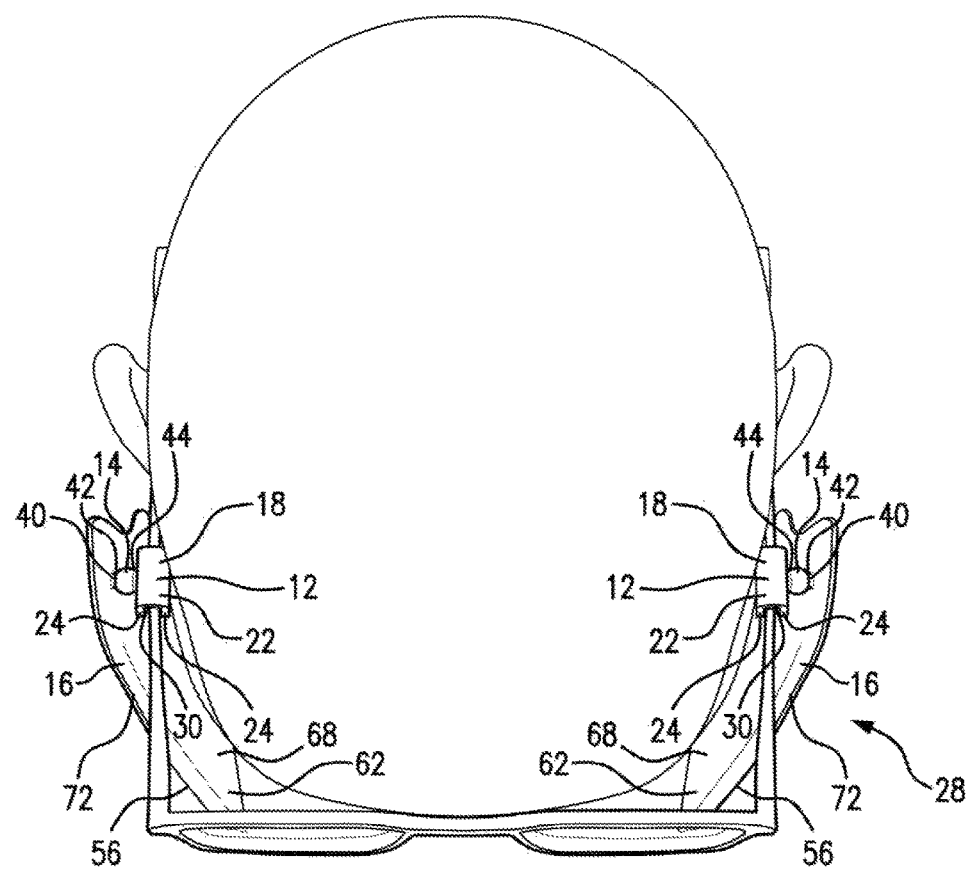
FIG. 13d is a top elevational view of a first and second protective skin shades system having a means for mounting, a ball and socket interconnector and an attached combination cheek and temple shield with each mounted on an eyeglasses arm near the eat region of an user according to the present invention.

Referring to FIGS. 13a, 13c end 13d, another type of shield is a combination cheek shield and temple shield (72).

A combination cheek shield and temple shield (72) is intended for use in a manner where it will be located opposite the cheek and temple regions of a user's face. The combination cheek shield and temple shield (72) is sized and shaped to have an inner surface that is correspondable with an area of a user's cheek and temple regions in an analogous manner to that disclosed with respect to the cheek shield (68) and temple shield (70). In preferred embodiments, the combination cheek shield and temple shield (72) follows and enhances facial features and is aerodynamic. This enhances stability on a user's face and enhances sun protection.

Referring to FIGS. 3a, 3b, 3 and 9, another type of shield is the forehead shield (76) which is a component of a forehead shield assembly (74). The forehead shield (76) has an inner surface that is correspondable with an area of a user's forehead region. Being in correspondence with a user's forehead defines a lower portion in proximity to eye brews and noise of the user. In a preferred embodiment, the forehead shield (76) has the configuration of a shell-like plate with a rounded cross-section and a perimeter having a generally oval outline. In particular, the inner surface (53) of the forehead shield assembly (74) is concave and the concomitantly, the outer surface (60) is convex. Accordingly, when worn by a user, there is an air space between the inner surface (58) of the forehead shield (76) and user's forehead to enhance comfort and cooling.

Continuing to refer to FIGS. 3a, 3b, 8 and 9, the forehead shield assembly (74) has a means for mounting (12) to a noise bridge. In a preferred embodiment, the means for mounting (12) to a noise bridge is two clips (18, 20) as disclosed above. The clips (18, 20) are positioned and attached on the lower portion of the forehead shield (76) so as to facilitate mounting to the nose bridge of eyeglasses.

Figure 3A:
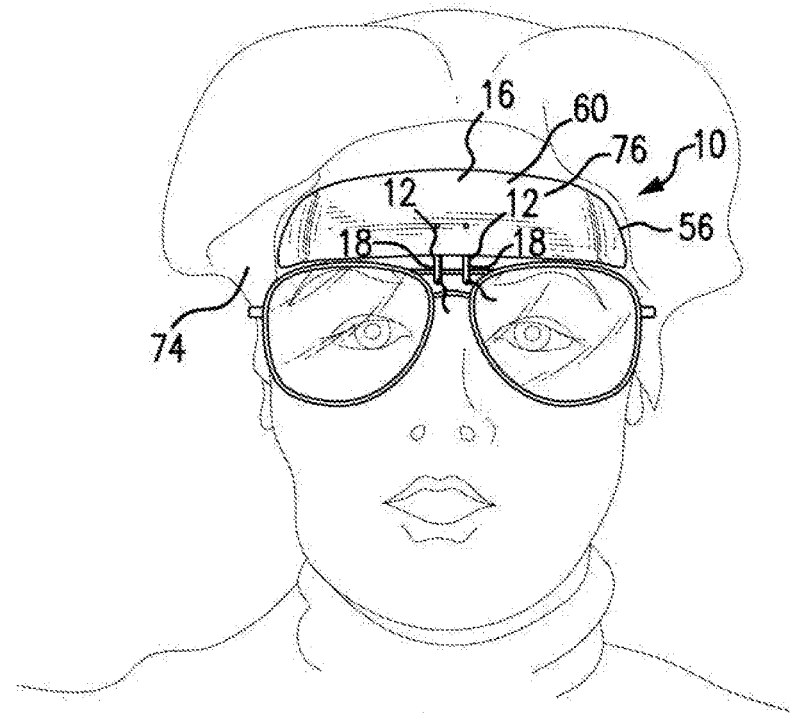
FIG. 3a shows a front perspective view of a forehead shield according to the present invention being worn by a user.
Figure 3B:
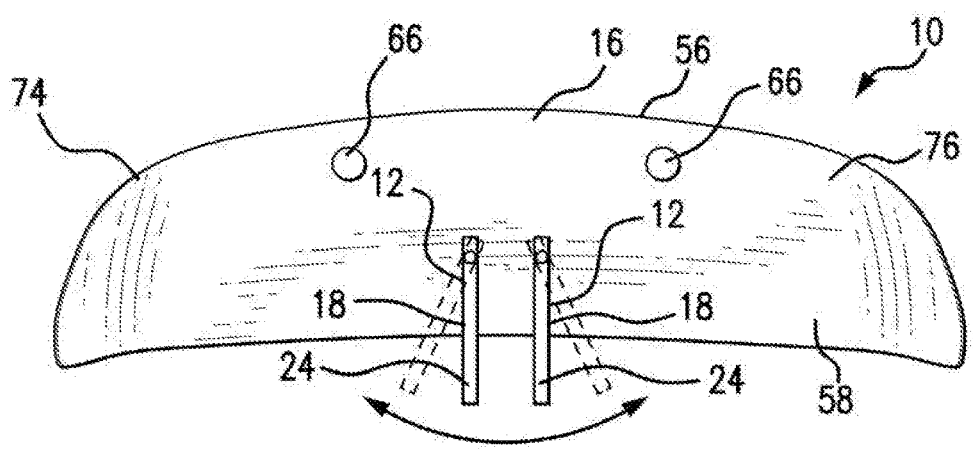
FIG. 3b shows an elevational view of the inner surface of a forehead shield having rotatable clips and cushions according to the present invention.
Figure 4A:
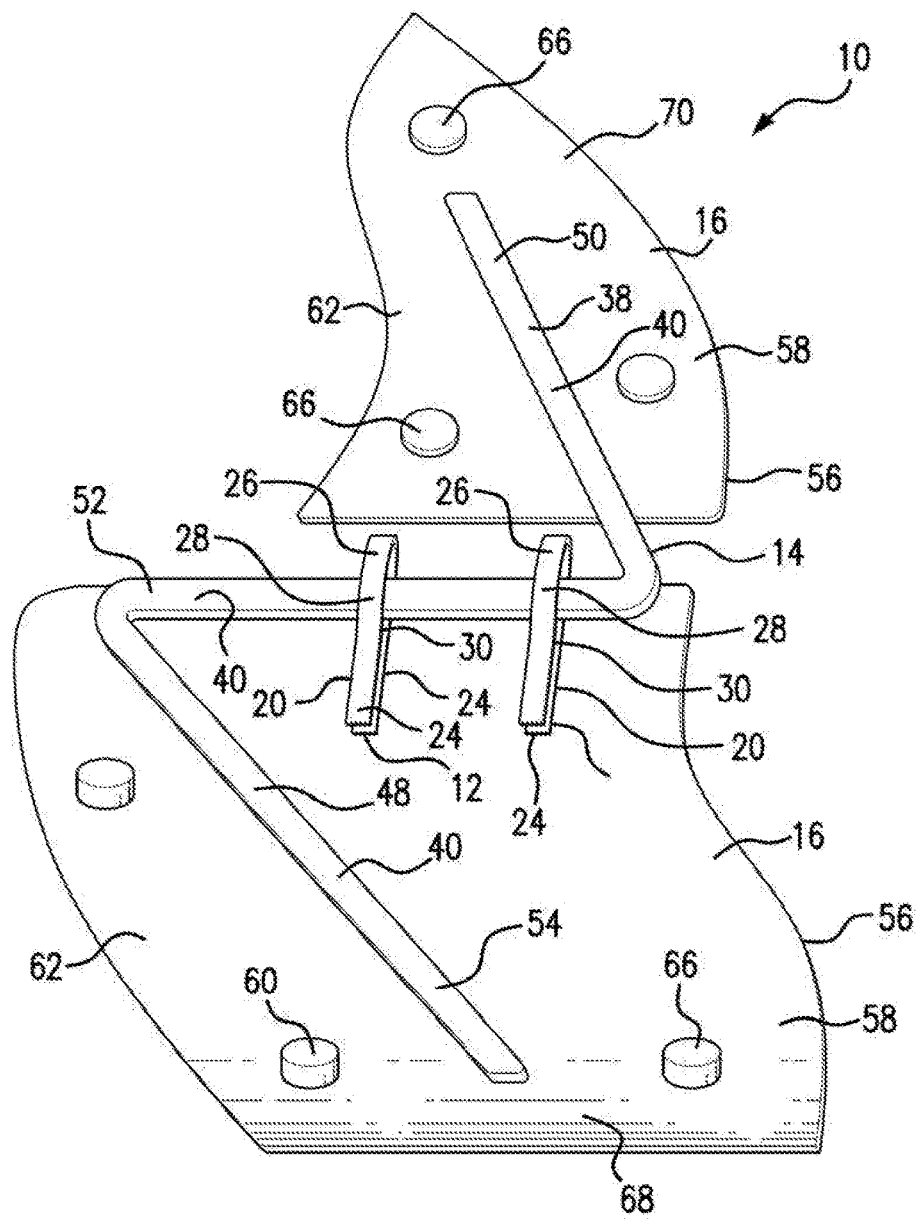
FIG. 4a shows an elevational view of the inner surface of on assembly of a "Z" shaped rocker arm, clips, temple shield and cheek shield with cushions according to the present invention.
Figure 4B:
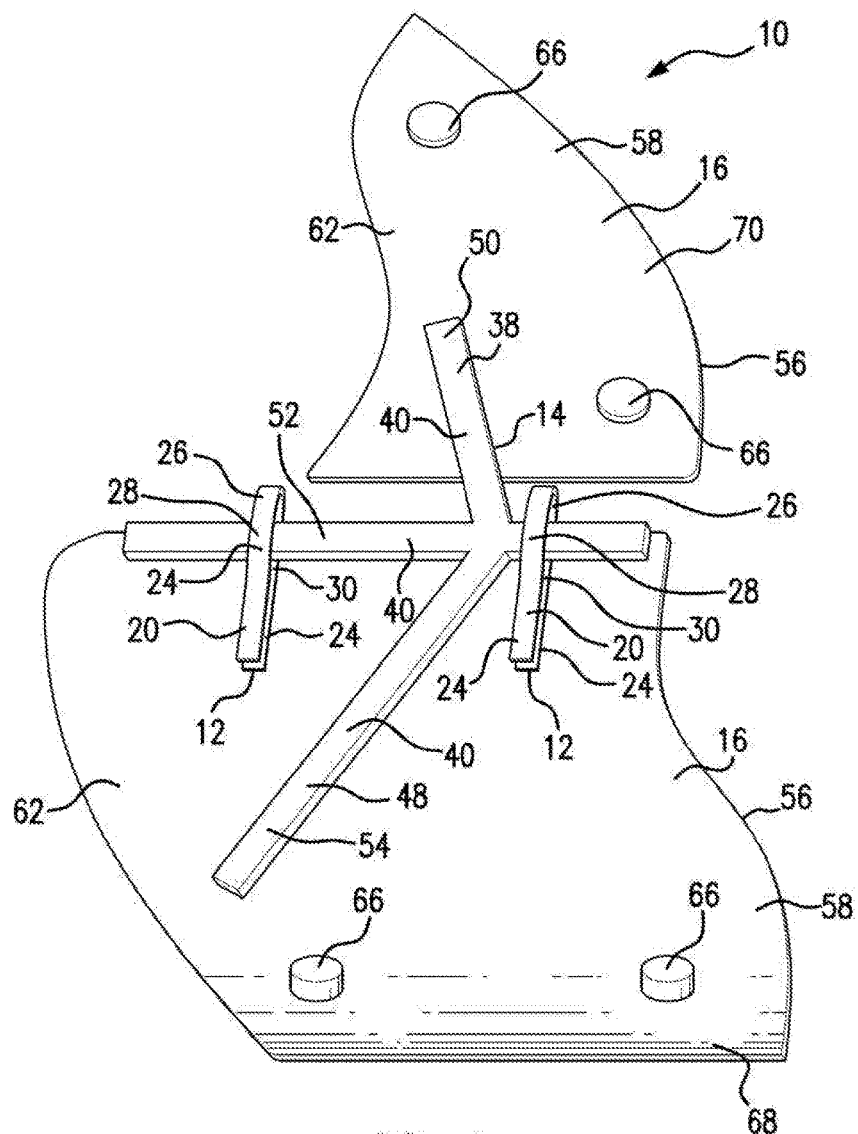
FIG. 4b shows an elevational view of the inner surface of an assembly of a "X"-like shaped rocker arm, clips, temple shield and cheek shield with cushions according to the present invention.
Figure 4C:
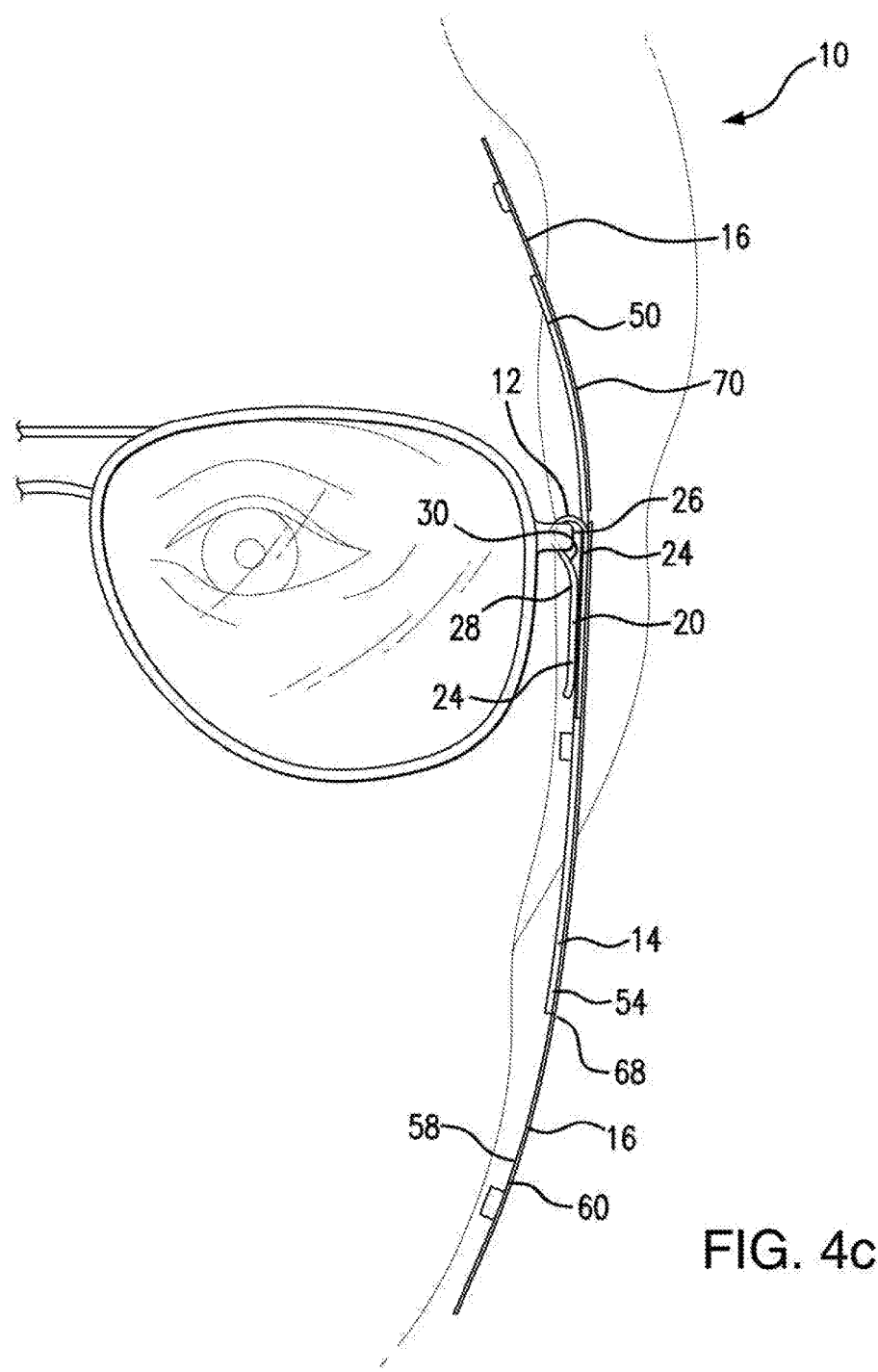
FIG. 4c shows a cross-sectional view of an assembly of a temple shield, cheek shield with cushions and clips according to the present invention mounted to an eyeglasses arm worn by a user.

Continuing to refer to FIGS. 3a and 3b, the clips (18, 20) can be fixedly attached by cementing, gluing or fusing. In a preferred embodiment, the clip (18, 20) are rotatable attached to forehead shield (76) using rivets or screw fasteners. In this embodiment, the ends of the prongs (24) of the clips (18, 20) can be spread apart or drawn closer together by rotation relative to the forehead shield (76). This facilitates attachment to different size noise bridges. In a more preferred embodiment there are positioning notches (32) or pairs of ridges (not illustrated) on the inner surface (30) of the forehead shield (76) to define particular spread distances. In a more preferred embodiment, there are positioning notches or pairs of ridges to define a first, second and third spread distances.

Not illustrated, alternative versions of the protective skin shields system (10) have compatible capabilities to smart phones, skin cell moistening systems, cooling systems, heat defusing systems, a measuring system that would advise a user of an extreme heat condition and/or a system that provides feedback of how much sun radiation has been repelled. An alternative version of the invention has the morphing capability of retractable shields that, can be controlled by the user.

An alternative embodiment of the present invention is a kit for shading the face of a user from the sunlight and/or other harmful ultraviolet radiation comprised of a first protective skin shields system (10) and a second protective skin shields system (10). In alternative embodiments, the skin shields system (10) of the kit has a cheek shield and a temple shield (70) or a combination cheek and temple shield (72). An alternative embodiment of the present invention is a kit for shading the face of a user from the sunlight and/or other harmful ultraviolet radiation comprised the above disclosed kit for shading and a third protective skin shields system (10) having a forehead shield assembly (74).

Referring to FIGS. 1a, 2a, 3a, 4c, 6, 8, 9, 12c, 13a, 13b, 13c and 13d, the protective skin shields system (10) is for use with eyeglass frames by a user. Commonly worn eyeglasses are in various shapes and configurations. All, or almost all, are suitable for use with the present invention. A typical pair of eyeglasses has a front frame section. The front frame section has two orbits for holding lenses that are connected by a nose bridge. Pivotally connected at the outer top corners of the front frame section are temple arms having rear ends that articulate with a user's ears. The lens may clear for regular eyeglasses or tinted for sunglasses. Sunglasses are preferred for use with the invention so as to provide sun protection to the eyeball socket region of an user's face.

The user is characterized by having a face with a cheek region, a temple region and a forehead region.

Referring to FIGS. 1a, 2a, 2b, 3a, 4c, 6, 3, 9, 12a, 12b, 12c, 13a, 13b, 13c and 13d, the protective skin shields system (10) is mounted to eyeglasses. For example, where the means for mounting (12) is clips (18, 20), the clips (18, 20) are inserted, over the temple arras and/or noise bridge. In a preferred embodiment, a user can adjust the position of the clip (18, 20) up and down relative to the temple arm and/or noise bridge and thereby adjust the position of the sunshades system to suit the user's face. If the interconnector is a ball and socket connector, a user manipulates the spatial position of the shield to accomadate the dimensions of the user's face and/or to set the desired sun shading. Accordingly, mounting is as simple as putting on, making a minor adjustments and then being good to go.

Under ideal conditions, the protective skin shields system is positioned such that it mounts on the eyeglasses without contacting the user's face. Users do not keep their faces stationary in an isolation chamber and the protective skin shields system is subject to jolting, impacts and wind drag. If the interconnector (14) is a rocker arm (38), the rocker arm (38) can rotate with one shield moving towards or against the user's face. A member that is contactable (66) with the user's face can press against the user's face so as to impose a back-force against the shield and thereby ease the shield away from the user's face. If the interconnector (14) is a tensioned ball and socket connector, the connector can give way so as to absorb impact. Thereafter, a user can readjust the position of a shield (16) that moved to absorb impact. The result being that the protective skin shields system (10) has a capacity to stay stable on the user's face.

Referring to FIGS. 3a, 3b, 8 and 9, optionally, a forehead shield assembly is removably mounted to the front frame section at the nose bridge.

In its installed position, the protective skin shields system (10) operates to block and to protect facial skin from the solar and other harmful ultraviolet radiation. When desired, the protective skin shields system (10) may be quickly removed from the eyeglasses.

An alternative embodiment of the present invention is a method for shading the face of an user from solar and/or other ultraviolet radiation. The method is comprised of the following steps:
  a. providing a protective skin shields system (10) as disclosed above;
  b. providing eyeglasses having a temple arm and nose bridge;
  c. mounting the protective skin shields system (10) to the eyeglasses and
  d. donning the eyeglasses on the user's face.

In an alternative embodiment of the invention, the method for providing sun shielding has the additional steps of:
a. Providing a second protective skin shields system (10) as disclosed above and
b. mounting the second protective skin shields system (10) as disclosed above to the eyeglasses.

In an alternative embodiment of the invention, the method for providing sun shielding has as the additional steps of:
a. Providing a third protective skin shields system (10) as disclosed above and
b. mounting the third protective skin shields system (10) as disclosed above to the eyeglasses.

The previously described versions of the present invention have many advantages. One advantage of the protective skin shields system (10) is protecting from solar radiation and/or other harmful ultraviolet radiation areas of the face that are susceptible to developing melasma, age spots, moles and/or premature wrinkles. The protective skin shields system (10) is a practical device to shade against lateral and frontal sun exposure.

Another advantage of the protective skin shields system (10) is a robust mounting capability to a large variety existing eyeglasses and sunglasses worn by users.

Another advantage of the protective skin shields system (10) is that it is a solar radiation and/or other harmful ultraviolet radiation blocker without adding a heat buid-up element and/or an unfashionable element by contemporary standards.

Another advantage is that a protective skin shields system (10) can be readily fabricated using commonly available materials and equipment based upon that which is available in the contemporary economy.

Another advantage is that a protective skin shields system (10) can be inexpensive based upon that which is commonly available in the contemporary economy.

Another advantage arises from ozone layer depletion. As the ozone layer is depleted, ultraviolet radiation increases. A pair of sunglasses offers limited protection. The protective skin shields system (10) provides a sun protection to a younger generation being exposed to greater ultraviolet radiation, as well as bring benefits to mature users.

Although the present invention has been described in considerable detail with reference to certain preferred versions thereof, other versions are possible with substituted, varied and/or modified materials and/or substituted, varied and/or modified steps are employed. These other versions do not depart from the invention. Therefore, the spirit and scope of the appended claims should not be limited to the description of the preferred versions contained herein.

I claim:

1. A protective skin shields system for use with eyeglasses frames that are wearable by a user where said eyeglasses frames have a nose bridge and temple arms and said user has a face with a cheek region, a temple region and a forehead region that is comprised of:
   a) a means for mounting to an eyeglasses arm or noise bridge;
   b) one or more interconnectors which are operatively attached to the means for mounting selected from the group consisting of a rocker arm having shield attaching positions and a tensioned ball and socket connector having a shield attaching position and
   c) one or more shields where a shield has the property of impeding the transmission of sun light, is configured so as to comport with either a cheek, a temple, a cheek and temple and/or a forehead region of a user's face and is attached to a shield attaching position,
   whereby the cheek, temple, and/or forehead regions of a user's face are capable of being shaded from sunlight.

2. The protective skin shields system of claim 1 where the means for mounting is selected from the group of a U-like clip having inner surfaces with a resilient means which is suitable for a friction fit engagement with an eyeglasses arm or noise bridge and a hairpin-like clip having inner surfaces with a resilient means which is suitable for a friction fit engagement with an eyeglasses arm or noise bridge.

3. The protective skin shields system of claim 2 where the one or more interconnectors are a tensioned ball and socket connector having a shield attaching position.

4. The protective skin shields system of claim 3 where the one or more shields are selected from the group consisting of (i) two shields with one shield being a shield that comports with cheek region and the other shield being a shield which comports with a temple region and (ii) one shield that is a shield which comports with cheek and temple regions.

5. The protective skin shields system of claim 4 where a shield is selected from the group consisting of a shield having the additional property of a peripheral portion conformed for wind deflection and a shield having the additional property of a peripheral portion conformed for wind deflection where said peripheral portion conformed for wind deflection has a plurality of ventilation openings.

6. A kit for shading the face of a user from sunlight comprised of:
   a) a first protective skin shields system of claim 1 and
   b) a second protective skin shields system of claim 1.

7. The kit for shading the face of a user from sunlight of claim 6 where:
   a) the first protective skin shields system is characterized by:
      i) the means for mounting being selected from the group of a U-like clip having inner surfaces with a resilient means which is suitable for a friction fit engagement with an eyeglasses arm or noise bridge and a hairpin-like clip having inner surfaces with a resilient means which is suitable for a friction fit engagement with an eyeglasses arm or noise bridge;
      ii) the one or more interconnectors being a tensioned ball and socket connector having a shield attaching position and
      iii) the one or more shields being selected from the group consisting of (i) two shields with one shield being a shield that comports with cheek region and the other shield being a shield which comports with a temple region and (ii) one shield that is a shield which comports with cheek and temple regions and
   b) the second protective skin shields system is characterized by:
      i) the means for mounting being selected from the group of a U-like clip having inner surfaces with a resilient means which is suitable for a friction fit engagement with an eyeglasses arm or noise bridge and a hairpin-like clip having inner surfaces with a resilient means which is suitable for a friction fit engagement with an eyeglasses arm or noise bridge;
      ii) the one or more interconnectors being a tensioned ball and socket connector having a shield attaching position and
      iii) the one or more shields being selected from the group consisting of (i) two shields with one shield being a shield that comports with cheek region and the other shield being a shield which comports with a temple region and (ii) one shield that is a shield which comports with cheek and temple regions.

8. The kit for shading the face of a user from sunlight of claim 7 having a third protective skin shields system of claim 1 having a forehead shield.

9. A method for shading from sunlight the face of a user who has eyeglasses where said eyeglasses have a nose bridge and temple arms comprised of:
   a) providing a protective skin shields system of claim 1;
   b) mounting the protective skin shields systems to the eyeglasses and
   c) donning the eyeglasses,
   where step c is interchangeable in the order of steps.

10. The method for shading from sunlight the face of a user of claim 9 comprised of the additional steps of:
    a) providing a second protective skin shields system of claim 1 and
    b) mounting the second protective skin shields systems to the eyeglasses,
       where the steps 9*b*, 10*a* and 10*b* are interchangeable in the order of steps.

11. The method for shading from sunlight the face of a user of claim 10 where protective skin shields system is characterized by:
    a) the means for mounting being selected from the group of a U-like clip having inner surfaces with a resilient means which is suitable for a friction fit engagement with an eyeglasses arm or noise bridge and a hairpin-like clip having inner surfaces with a resilient means which is suitable for a friction fit engagement with an eyeglasses arm or noise bridge;
    b) the one or more interconnectors being a tensioned ball and socket connector having a shield attaching position and
    c) the one or more shields being selected from the group consisting of (i) two shields with one shield being a shield that comports with cheek region and the other shield being a shield which comports with a temple region and (ii) one shield that is a shield which comports with cheek and temple regions.

12. A protective skin shields system for use with eyeglasses frames that are wearable by a user where said eyeglasses frames have a nose bridge and temple arms and said user has a face with a cheek region, a temple region and a forehead region that is comprised of:
    a) a means for mounting to an eyeglasses arm or noise bridge that is selected from the group of a U-like clip having inner surfaces with a resilient means which is suitable for a friction fit engagement with an eyeglasses arm or noise bridge and a hairpin-like clip having inner surfaces with a resilient means which is suitable for a friction fit engagement with an eyeglasses arm or noise bridge;
    b) one or more tensioned ball and socket interconnectors each having a post connector depending from the ball with a shield attaching position which is operatively attached at the socket to the means for mounting and
    c) one or more shields where a shield has the property of impeding the transmission of sun light, configured so as to comport with either a cheek, a temple, a cheek and temple and/or a forehead region of a user's face and each shield is attached to a shield attaching position,
    whereby the cheek, temple, and/or forehead regions of a user's face are capable of being shaded from sunlight.

13. The protective skin shields system of claim 12 where the one or more shields are selected from the group consisting of (i) two shields with one shield being a shield that comports with cheek region and the other shield being a shield which comports with a temple region and (ii) one shield that is a shield which comports with cheek and temple regions.

14. The protective skin shields system of claim 13 where a shield is selected from the group consisting of a shield having the additional property of a peripheral portion conformed for wind deflection and a shield having the additional property of a peripheral portion conformed for wind deflection where said peripheral portion conformed for wind deflection has a plurality of ventilation openings.

15. A protective skin shields system for use with eyeglasses frames that are wearable by a user where said eyeglasses frames have a nose bridge and temple arms and said user has a face with a cheek region, a temple region and a forehead region that is comprised of:
    a) a rocker arm having an S-like configuration which is characterized as having an upper section, an intermediate section and a lower section;
    b) a temple shield that is attached to the upper section of the rocker arm;
    c) a cheek shield that is attached to the lower section of the rocker arm and
    d) one or more clips having a U-like or hairpin-like configuration having the capability to stably and rotatably mount to an eyeglasses arm that are disposed to the assembly of the rocker arm, temple shield and cheek shield approximately in register with the intermediate section of the rocker arm,
    whereby when the protective skin shields system is rotatably mounted to an eyeglasses arm worn by a user, the rocker arm can rotate such that one shield or the other shield can press against the user's face and thereby enhance stability when the protective skin shields system is subjected to jolting, jarring and/or wind drag.

16. The protective skin shields system of claim 15 where the inner surface of a clip has a resilient lining.

17. The protective skin shields system of claim 16 where the prong of a clip is configured to have a plurality of positioning notches.

18. The protective skin shields system of claim 15 where a shield is selected from the group consisting of a shield having the additional property of a peripheral portion conformed for wind deflection and a shield having the additional property of a peripheral portion conformed for wind deflection where said peripheral portion conformed for wind deflection has a plurality of ventilation openings.

19. The protective skin shields system of claim 18 where the shield has member that is contactable that is selected from the group consisting of a cushion pad and a pedestal assembly.

* * * * *